US012533841B2

(12) United States Patent
Maehara et al.

(10) Patent No.: US 12,533,841 B2
(45) Date of Patent: Jan. 27, 2026

(54) ALIPHATIC POLYESTER COPOLYMER

(71) Applicants: MITSUBISHI GAS CHEMICAL COMPANY, INC., Chiyoda-ku (JP); The University of Tokyo, Bunkyo-ku (JP)

(72) Inventors: Akira Maehara, Niigata (JP); Tadahisa Iwata, Bunkyo-ku (JP); Taizo Kabe, Sayo-gun (JP); Yuki Kawamura, Bunkyo-ku (JP)

(73) Assignees: MITSUBISHI GAS CHEMICAL COMPANY, INC., Chiyoda-ku (JP); The University of Tokyo, Bunkyo-ku (JP)

( * ) Notice: Subject to any disclaimer, the term of this patent is extended or adjusted under 35 U.S.C. 154(b) by 795 days.

(21) Appl. No.: 17/610,798

(22) PCT Filed: May 13, 2020

(86) PCT No.: PCT/JP2020/019066
§ 371 (c)(1),
(2) Date: Nov. 12, 2021

(87) PCT Pub. No.: WO2020/230807
PCT Pub. Date: Nov. 19, 2020

(65) Prior Publication Data
US 2022/0203600 A1    Jun. 30, 2022

(30) Foreign Application Priority Data
May 13, 2019  (JP) .................................. 2019-090739

(51) Int. Cl.
B29C 55/02    (2006.01)
B29C 55/06    (2006.01)
(Continued)

(52) U.S. Cl.
CPC .............. *B29C 55/02* (2013.01); *C08L 67/04* (2013.01); *B29C 55/06* (2013.01); *B29C 61/00* (2013.01);
(Continued)

(58) Field of Classification Search
None
See application file for complete search history.

(56) References Cited

U.S. PATENT DOCUMENTS 4,537,738 A    8/1985  Holmes
4,876,331 A   10/1989  Doi
(Continued)

FOREIGN PATENT DOCUMENTS

CN    1401021 A     3/2003
EP    0 849 311 A2  6/1998
(Continued)

OTHER PUBLICATIONS

Iwata T. "Strong fibers and films of microbial polyesters" Macromolecular Bioscience, vol. 5, Issue 8 (Aug. 12, 2005) pp. 689-701. (Year: 2005).*
(Continued)

*Primary Examiner* — Vivian Chen
(74) *Attorney, Agent, or Firm* — Oblon, McClelland, Maier & Neustadt, L.L.P.

(57) ABSTRACT

An object of the present invention is to provide a stretchable polyester having shape followability and flexibility by elastic response and being able to suppress deterioration over time due to secondary crystallization. The present invention provides a stretchable polyester which is an aliphatic copolymer polyester containing two or more types of monomer units, wherein the stretchable polyester contains an α-form and an amorphous structure, and a degree of orientation determined by X-ray of the α-form is 50% or greater.

18 Claims, 14 Drawing Sheets

(51) Int. Cl.
| | |
|---|---|
| B29C 61/00 | (2006.01) |
| B29K 67/00 | (2006.01) |
| C08G 63/06 | (2006.01) |
| C08J 5/18 | (2006.01) |
| C08L 67/04 | (2006.01) |

(52) U.S. Cl.
CPC .. B29K 2067/00 (2013.01); B29K 2995/0039 (2013.01); B29K 2995/0041 (2013.01); B29K 2995/006 (2013.01); B29K 2995/0077 (2013.01); B29K 2995/0082 (2013.01); C08G 63/06 (2013.01); C08J 5/18 (2013.01); C08J 2367/04 (2013.01); C08L 2201/06 (2013.01); C08L 2203/02 (2013.01); C08L 2203/12 (2013.01); C08L 2203/16 (2013.01)

(56) References Cited

U.S. PATENT DOCUMENTS

| | | | |
|---|---|---|---|
| 5,766,748 A | 6/1998 | Ikado et al. | |
| 5,917,002 A | 6/1999 | Doi et al. | |
| 6,821,612 B1* | 11/2004 | Melik | C08G 63/06 428/221 |
| 2002/0156150 A1* | 10/2002 | Williams | C08G 63/06 523/113 |
| 2003/0032767 A1 | 2/2003 | Tada et al. | |
| 2003/0088052 A1 | 5/2003 | Yamane | |
| 2006/0055081 A1* | 3/2006 | Iwata | C08J 5/18 264/288.4 |
| 2008/0241899 A1* | 10/2008 | Rhee | C08F 293/00 536/23.1 |
| 2011/0305858 A1* | 12/2011 | De Groof | B32B 7/12 264/173.17 |
| 2013/0137788 A1 | 5/2013 | Yamamura et al. | |
| 2014/0199557 A1* | 7/2014 | Naito | C08J 7/0427 428/483 |
| 2015/0291771 A1 | 10/2015 | Suzuki et al. | |
| 2016/0046774 A1 | 2/2016 | Aoyama et al. | |
| 2016/0237462 A1 | 8/2016 | Arikawa et al. | |
| 2020/0009293 A1* | 1/2020 | Teu | A61L 27/54 |
| 2020/0347416 A1 | 11/2020 | Maehara | |
| 2023/0398257 A1* | 12/2023 | Maehara | D01F 6/84 |

FOREIGN PATENT DOCUMENTS

| | | |
|---|---|---|
| EP | 2 607 415 A1 | 6/2013 |
| JP | 59-59419 A | 4/1984 |
| JP | 61-120724 A | 6/1986 |
| JP | 64-48821 A | 2/1989 |
| JP | 3-216193 A | 9/1991 |
| JP | 3-292889 A | 12/1991 |
| JP | 5-64591 A | 3/1993 |
| JP | 6-336523 A | 12/1994 |
| JP | 7-275344 A | 10/1995 |
| JP | 07-290564 A * | 11/1995 |
| JP | 08-284016 A * | 10/1996 |
| JP | 9-208817 A | 8/1997 |
| JP | 9-300845 A | 11/1997 |
| JP | 07-300720 A * | 4/1999 |
| JP | 2002-371431 A | 12/2002 |
| JP | 3680132 B2 | 5/2005 |
| JP | 2006-168159 A | 6/2006 |
| JP | 2008-120888 A | 5/2008 |
| JP | 4562316 B2 | 8/2010 |
| JP | 6368245 B2 | 8/2018 |
| TW | 201219463 A1 | 5/2012 |
| TW | 201441284 | 11/2014 |
| WO | WO 01/79334 A1 | 10/2001 |
| WO | WO 2008/099586 A1 | 8/2008 |
| WO | WO 2014/065253 A1 | 5/2014 |
| WO | WO 2019/044837 A1 | 3/2019 |

OTHER PUBLICATIONS

Orts, W.J. et al. "Observation of strain-induced β form in poly(β-hydroxyalkanoates)" Macromolecules 1990, vol. 23, issue 26, pp. 5368-5370. (Year: 1990).*

Phongtamrug, S. et al. "X-ray Crystal Structure Analysis of Poly(3-hydroxybutyrate) β-Form and the Proposition of a Mechanism of the Stress-Induced α-to-β Phase Transition" Macromolecules, vol. 52, (2019) pp. 2995-3009. (Year: 2019).*

Iwata T. et al. "Time-Resolved X-ray Diffraction Study on Poly[(R)-3-hydroxybutyrate] Films during Two-Step-Drawing: Generation Mechanism of Planar Zigzag Structure" Biomacromolecules 2005, vol. 6, issue 3, pp. 1803-1809. (Year: 2005).*

Tanaka, F. et al. "The deformation of the chain molecules and crystallites in poly([R]-3-hydroxybutyrate) and poly(4-hydroxybutyrate) under tensile stress" Polymer Degradation and Stability, vol. 85, Issue 2, 2004, pp. 893-901. (Year: 2004).*

Kunioka, M. et al. "Crystalline and thermal properties of bacterial copolyesters: poly(3-hydroxybutyrate-co-3-hydroxyvalerate) and poly(3-hydroxybutyrate-co-4-hydroxybutyrate)" Macromolecules 1989, vol. 22, issue 2, pp. 694-697. (Year: 1989).*

Wang, S.; Chen, W.; Xiang, H.; Yang, J.; Zhou, Z.; Zhu, M. Modification and Potential Application of Short-Chain-Length Polyhydroxyalkanoate (SCL-PHA). Polymers 2016, 8, 273. (Year: 2016).*

Combined Chinese Office Action and Search Report issued on Feb. 2, 2023 in Chinese Patent Application No. 202080035643.3, 10 pages.

W. J. Orts, R. H. Marcheasault, T. L. Bluhm, G. K. Hamer "Observation of Strain-Induced β Form in Poly(β-hydroxyalkanoates)", Macromolecules, vol. 23, No. 26, 1990 pp. 5368-5370, 3 pages.

Extended European Search Report issued May 18, 2022 in European Patent Application No. 20806199.4, 7 pages.

Jian Zhou, et al., "Stretch-Induced α-to-β Crystal Transition and Lamellae Structural Evolution of Poly(butylene adipate-ran-terephthalate) Aliphatic-Aromatic Copolyester," Macromolecules, vol. 52, No. 3, Feb. 4, 2019, 35 pages.

International Search Report issued Jul. 14, 2020 in PCT/JP2020/019066 (with English translation), 13 pages.

International Preliminary Report on Patentability and Written Opinion of the International Searching Authority issued Nov. 16, 2021 in PCT/JP2020/019066 (with English translation), 16 pages.

Alistair J. Anderson, et al., "Occurrence, Metabolism, Metabolic Role, and Industrial Uses of Bacterial Polyhydroxyalkanoates" Microbiological Reviews, vol. 54, No. 4, Dec. 1990, pp. 450-472.

S. Kusaka, et al., "Molecular Mass of Poly[(R)-3-hydroxybutyric acid] Produced in a Recombinant *Escherichia coli*" Applied Microbiology and Biotechnology, vol. 47, 1997, pp. 140-143.

Kai-Hee Huong, et al., "Microbial-Based Synthesis of Highly Elastomeric Biodegradable Poly(3-hydroxybutyrate-co-4-hydroxybutyrate) Thermoplastic" International Journal of Biological Macromolecules, vol. 101, 2017, pp. 983-995.

David P. Martin, et al., "Medical Applications of poly-4-hydroxybutyrate: a Strong Flexible Absorbable Biomaterial" Biochemical Engineering Journal, vol. 16, 2003, pp. 97-105.

Takashi Ushida, "Elastic Biodegradable Polymer" Journal of the Japan Society of Mechanical Engineers, vol. 106, 2003, p. 897.

Hideki Abe, et al., "Physical Properties and Enzymatic Degradability of Copolymers of (R)-3-Hydroxybutyric and 6-Hydroxyhexanoic Acids" Macromolecules, vol. 28, 1995, pp. 7630-7637.

Yoji Hori, et al., Chemical Synthesis of High Molecular Weight Poly (3-hydroxybutyrate-co-4-hydroxybutyrate) Polymer, vol. 36, No. 24, 1995, pp. 4703-4705.

D. K. Gilding, et al., "Biodegradable Polymers for use in Surgery Polyglycolic/Poly(Actic Acid) Homo- and Copolymers: 1" Polymer, vol. 20, 1979, pp. 1459-1464.

Yuji Saito, et al., Microbial Synthesis and Properties of Poly( 3-hydroxybutyrate-co-4-hydroxybutyrate) Polymer International, vol. 39, 1996, pp. 169-174.

Zheng-Jun Li, et al., "Production of Poly(3-hydroxybutyrate-co-4-hydroxybutyrate) from Unrelated Carbon Sources by Metabolically Engineered *Escherichia coli*" Metabolic Engineering, vol. 12, 2010, pp. 352-359.

(56) References Cited

OTHER PUBLICATIONS

G. J. M. de Koning, et al., Crystallization Phenomena in Bacterial Poly[ ( R)-3-hydroxybutyrate]: 2. Embrittlement and Rejuvenation Polymer, vol. 34, No. 19, 1993, pp. 4089-4094.

Combined Taiwanese Office Action and Search Report issued Jan. 31, 2024, in corresponding Taiwanese Patent Application No. 109115863 (with English Translation of Category of Cited Documents), 5 pages.

* cited by examiner

ALIPHATIC POLYESTER COPOLYMER

CROSS-REFERENCE TO RELATED APPLICATIONS

The present application is a 35 U.S.C. § 371 national stage patent application of International patent application PCT/JP2020/019066, filed on May 13, 2020, which is based on and claims the benefits of priority to Japanese Application No. 2019-090739, filed on May 13, 2019. The entire contents of these applications are incorporated herein by reference.

TECHNICAL FIELD

The present invention relates to a stretchable polyester having high shape followability and flexibility as well as repeated elasticity.

BACKGROUND ART

In recent years, a large amount of synthetic plastics are produced and disposed by burning and by landfill disposal, but problems such as generation of poisonous gases at the time of burning, pressure on capability of landfill disposal, and ground loosening have been attracting attention. Furthermore, due to disposal and leakage of synthetic plastics into the environment, adverse effects on the ecosystem have been concerned. Due to variety of types of plastics, separation and reuse thereof require effort and cost, and only a small portion of plastics is recycled. Thus, biodegradable plastics that are degraded to carbon sources that can be utilized by organisms in the environment have been attracting attention.

Meanwhile, in the medical field, biodegradable plastics have been attracting attention as biodegradable raw materials for, for example, implant materials that do not need to be collected, carriers for sustained release of medicines, and scaffold for regenerative therapy.

Biodegradable materials such as polyglycolic acid, polylactic acid, hydroxyapatite, collagen, and hyaluronic acid, are used in medical practice. These materials are characterized by biocompatibility and bioabsorbability and contribute to improvement in medical treatment, such as suturing for a patient for whom removal of stitches cannot be performed and for a part that does not require re-incision, implant materials that are desirably absorbed and replaced with body tissues after strength is maintained for a period of time, carriers for sustained release of medicines such as pharmaceutical products and bioactive substances, and scaffold for regenerative therapy. Meanwhile, many of these known bioabsorbable materials lack elasticity, and many of these are hard as a single raw material, and use thereof has been limited.

Polyhydroxyalkanoates (PHAs) are thermoplastic polyesters that are accumulated in microorganisms and are drawing attention as a biodegradable, biocompatible, and bioabsorbable plastic, and many studies have been conducted (Non-Patent Document 1). At least 100 types of monomer units constituting PHAs are known, among which a notable example is poly-3-hydroxybutyrate (hereinafter abbreviated as "P(3HB)"), which is composed of (R)-3-hydroxybutyrate (hereinafter abbreviated as "3HB"). (Non-Patent Document 1)

P(3HB) has a high melting point that is roughly the same degree as that of polypropylene (hereinafter, abbreviated as PP), has an elongation at break of 5% or less while having a strength at break that is roughly the same degree as that of PP, has a glass transition temperature of 4° C. which is not higher than room temperature, has a high crystallinity, and is a hard and brittle material. In a case where it is attempted to industrially utilize PHA, as methods for enhancing the physical properties thereof, a method of introducing a second component monomer unit to form a copolymer, and a method of increasing the molecular weight have been known.

Regarding the method of introducing a second component monomer unit to form a copolymer, examples include copolymers to which 3-hydroxyvalerate (hereinafter, 3HV), 3-hydroxyhexanoate (hereinafter, 3HH), 4-hydroxybutyrate (hereinafter, 4HB), lactate (hereinafter, LA), glycolate (hereinafter, GA), 3-hydroxypropionate (hereinafter, 3HP), or a long-chain hydroxyalkanoate is introduced.

Furthermore, as a method for increasing the molecular weight, there is a method for producing an ultra high molecular weight P(3HB) by introducing a P(3HB) biosynthetic gene (phaCAB) extracted from a P(3HB) synthesizing bacterium *Cupriavidus necator* into *Escherichia coli* XL1-Blue having no PHA synthesis system/degradation system, and culturing the genetically modified bacterium at pH 6 (Non-Patent Document 2); a method for culturing a strain in which PHA-degrading enzyme gene of a PHA-producing wild strain is disrupted (Patent Document 1); and a method for obtaining a ultrahigh molecular weight PHA by adjusting culture conditions of a PHA-producing wild strain (Patent Document 2).

Aliphatic polyester, including PHA, typically has a slow crystallization speed, has a glass transition temperature of not higher than room temperature, and tends to have a reduced elongation at break because deterioration progresses over time due to secondary crystallization after formation. The amorphous part that did not undergo crystallization in the initial crystallization is present in between lamellar crystals. The secondary crystallization refers to the condition where the molecular chains of the amorphous part is incorporated into the crystal part due to molecular motion and thus the degree of crystallinity is enhanced. Furthermore, in some cases, annealing, which is a heat treatment to eliminate the strain in a plastic inner part after formation of the plastic, may be performed, and the crystallization progressing during this heat treatment is also referred to as secondary crystallization. It is known that, due to the secondary crystallization, tension is applied to molecular chains of the amorphous part, thus cracking occurs, and deterioration occurs over time. Furthermore, when the crystal becomes larger, a large force is applied on a tie molecule that connects a crystal to a crystal, and the entire crystal may be weak.

P(3HB) has a high crystallinity although the crystallization speed is slow, has a glass transition temperature of 4° C. which is not higher than room temperature, undergoes secondary crystallization during storage, and is a polymer that is hard and brittle and that undergoes deterioration of physical properties over time. Although, by copolymerizing the 3-hydroxyvalerate (3HV) unit, some improvement was observed in flexibility of P(3HB-co-3HV), it is known that the 3HB unit and the 3HV unit can be present in the same crystal lattice, and the glass transition temperature tends to be further lowered due to the copolymerization, and deterioration over time progresses by the secondary crystallization after the formation.

For a copolymer PHA including a second component unit that does not undergo cocrystallization with a 3HB unit, such as a 4-hydroxybutyrate (4HB) unit and a 3-hydroxyhexanoate (3HH) unit, improvement of extensibility and flexibility is expected than a copolymer with a 3HV unit by changing the proportion of the second unit component; however, the glass transition temperature is not higher than room temperature, and the characteristic that secondary crystallization tends to occur in a region that is rich in 3HB as a center after the formation still remains, and thus a problem of deterioration over time of mechanical properties, such as elongation, still remains.

Thus, there are a proposal to promote crystallization by blending an inorganic substance, such as boron nitride, titanium oxide, talc, lamellar silicate, calcium carbonate, sodium chloride, or metal phosphate, to a PHA polymer (Patent Document 3), and a proposal to blend sorbitol acetal, a compound having an amide bond, and pentaerythritol (Patent Document 4). These are means to promote the slow crystallization speed of the PHA and improve processability during formation and processing; however, there are still problems, such as causing reduction in strength, exhibiting insufficient effect including deterioration of surface appearance of a molded product, requiring addition of an additive, and deteriorating over time due to secondary crystallization. Furthermore, there are no description regarding elasticity of the molded product.

As a biodegradable plastic exhibiting elasticity, there are reports of P(3HB-co-4HB) (Non-Patent Documents 3 and 4), P(3HB-co-3HH) (Patent Document 5), and a material obtained by adding a photoreactive acrylate group and/or methacrylate group to a copolymer of caprolactone and lactic acid and/or glycolic acid and photocuring the copolymer (Patent Document 6).

It has already been known that a P(3HB-co-4HB) copolymer having from 3 to 60% of 4HB unit has excellent flexibility, and a molded product that is flexible and tough can be obtained by using this copolymer (Patent Document 7). Furthermore, it is described that the proportion of the 4HB can be freely adjusted (Patent Documents 8, 9, and 10), and Patent Document 11 describes performing stretch processing on a molded product formed from P(3HB). However, when a stretching force is released, the molded product becomes almost completely loose and does not shrink, and even for P(3HB-co-3HV), stretchability is 100% or less, and almost no elasticity is exhibited due to high crystallinity from the cocrystallization. Furthermore, a problem of deterioration over time due to secondary crystallization also remains.

Non-Patent Document 3 reports that the P(3HB-co-4HB) copolymer solvent-cast film having the 4HB proportion of 31% was stretched and then the obtained film exhibited elasticity that allowed the film to return to its substantially original shape; however, it is conceived that the problem of deterioration over time due to secondary crystallization still remains. Non-Patent Document 4 describes that a copolymer of 4HB and 3HB (4HB content from approximately 20 to 35%) is elastomeric and is a material that elongates upon applying a force and returns; however, it is conceived that the problem of deterioration over time due to secondary crystallization still remains. Both of the documents do not show hysteresis showing the repeated elasticity.

Patent Document 12 describes a mixed polyester molded product of a copolymer of 3HB and 4HB (4HB proportion from 60% to 95%) and a crystalline biodegradable polyester, the molded product being obtained by stretching, having biodegradability and low initial modulus of elasticity at a low strain, and having flexibility, toughness, and biodegradability. There is a description that the stretched and heat-treated yawn and film shrink to 60 to 70% of the condition immediately after stretching; however, it is not clear whether it is an elastic body that exhibits repeated elasticity, and it is conceived that the problem of deterioration over time due to secondary crystallization still remains.

Patent Document 13 describes that a copolymer of 3HB and 4HB (4HB from 30% to 99%) can be a medical material for soft tissues that exhibits excellent biocompatibility, elasticity, and flexibility and that does not cause problems in safety such as cytotoxicity; however, it is not clear whether it is an elastic body that exhibits repeated elasticity, and it is conceived that the problem of deterioration over time due to secondary crystallization still remains. Furthermore, there is a description of a compound body with another fiber composite knitted body/woven body, such as of polyethylene terephthalate, the compound body being a fiber composite of polyglycolic acid or polylactic acid or the like; however, it is not necessarily aimed at complete degradability.

Patent Document 14 describes that it is possible to further stretch a preliminary stretched material obtained by rapidly cooling a filament melt-extruded at the time of melt-spinning a P(3HB-co-3HH) copolymer to a temperature that is not higher than the glass transition temperature and then partially proceeding crystallization at a temperature that is not lower than the glass transition temperature, and the preliminary stretched material is a filament exhibiting elasticity that has a property that can suppress growth of spherulite. In this method, there are descriptions that rapid cooling to a temperature that is not higher than the glass transition temperature is required, that growth to three dimensional spherulite is less likely to occur even when the filament is allowed to stand still at room temperature for a while, and that brittleness is less likely to exhibited; however, at this stage, degradation over time due to secondary crystallization presumably still progresses. Furthermore, the degree of elasticity is not clear.

Furthermore, it is known that a raw material having elasticity can be obtained by adding a group such as acrylate to a copolymer of caprolactone and lactic acid and/or glycolic acid and photocuring the copolymer (Patent Document 6). However, when a lactic acid-caprolactone copolymer having a molecular weight from 2000 to 10000 is used, elastic deformation is only possible for approximately from 20 to 60% strain and the stress at this time is from 2 to 0.2 $N/mm^2$ or less, which is low, (Non-Patent Document 5). It is not a sufficiently high molecular weight polymer and cannot be used for a region where even higher strength and elasticity are required. Furthermore, a copolymer of caprolactone and lactic acid and/or glycolic acid is obtained by chemical synthesis using a polymerization catalyst such as tin octylate (tin 2-ethylhexanoate) and, in medical application, attention needs to be given to the used amount of the catalyst.

A biodegradable material exhibiting elastic deformation is obtained by crosslinking a copolymer obtained by copolymerizing a cyclic depsipeptide and ε-caprolactone with polyisocyanates (Patent Document 15). A polymerization catalyst such as tin 2-ethylhexanoate is used for synthesis of the copolymer, and it is not known whether melt-molding is possible after the crosslinked body is formed, and it is not clear whether it can be practically used.

CITATION LIST

Patent Documents

Patent Document 1: WO 2014/065253
Patent Document 2: WO 2019/044837

Patent Document 3: WO 2008/099586
Patent Document 4: JP 6368245 B
Patent Document 5: JP 4562316 B
Patent Document 6: JP 3680132 B
Patent Document 7: JP 64-48821 A
Patent Document 8: JP 3-216193 A
Patent Document 9: JP 3-292889 A
Patent Document 10: JP 5-64591 A
Patent Document 11: JP 59-059419 A
Patent Document 12: JP 6-336523 A
Patent Document 13: JP 7-275344 A
Patent Document 14: JP 4562316 B
Patent Document 15: JP 2008-120888 A Non-Patent Documents Non-Patent Document 1: Alistair J. Anderson et al., Microbiological Reviews, Vol. 54, No. 4, 450-472, 1990
Non-Patent Document 2: S. Kusaka et al., Applied Microbiology and Biotechnology, Vol. 47, 140-143, 1997
Non-Patent Document 3: Kai-Hee Huong et al., International Journal of Biological Macromolecules, Vol. 101, 983-995, 2017
Non-Patent Document 4: David P. Martin et al., Biochemical Engineering Journal, Vol. 16, 97-105, 2003
Non-Patent Document 5: Takashi Ushida, Journal of the Japan Society of Mechanical Engineers, Vol. 106, 897, 2003

SUMMARY OF INVENTION

Problem to be Solved by the Invention

An object of the present invention is to provide a stretchable polyester having shape followability and flexibility by elastic response.

Solution to Problem

As a result of diligent research to solve the problems described above, the inventors of the present invention found that, although a P(3HB-co-4HB) copolymer molded product has an α-form (α crystal) exhibiting random orientation and the cycle of the α crystal is not uniform, the P(3HB-co-4HB) copolymer molded product becomes a molded product exhibiting elastic response by, when the molded product is deformed by being stretched after a crystallization treatment is performed for a certain time period and a degree of orientation determined by X-ray of the α crystal is increased in a direction of the stretching while the degree of orientation of the α-form is maintained at 50% or greater, elongating molecular chains of an amorphous part in between an α crystal and an α crystal to exhibit a β-form (plane zigzag structure), and, when the load is removed, reducing or eliminating the β-form while the degree of orientation of the α crystal is maintained, and thus completed the present invention. Note that the α-form is a folded lamellar crystal, and the β-form is a plane zigzag stretched chain structure.

According to the present invention, the following inventions are provided.

<1> A stretchable polyester which is an aliphatic copolymer polyester containing two or more types of monomer units, wherein the stretchable polyester contains an α-form and an amorphous structure, and a degree of orientation determined by X-ray of the α-form is 50% or greater.

<2> The stretchable polyester according to <1> wherein a β-form is detected by wide-angle X-ray diffraction measurement and small-angle X-ray scattering measurement in a stretched state, and the β-form is significantly reduced compared to the stretched state or no β-form is detected by the wide-angle X-ray diffraction measurement and the small-angle X-ray scattering measurement in an unloaded state.

<3> The stretchable polyester according to <1> or <2>, wherein the stretchable polyester has an elasticity with a tensile elongation recovery rate of 20% or greater and 100% or less.

<4> A stretchable polyester which is an aliphatic copolymer polyester containing two or more types of monomer units, wherein the stretchable polyester has an elasticity with a tensile elongation recovery rate of 20% or greater and 100% or less.

<5> The stretchable polyester according to any one of <1> to <4>, wherein, after crystallization, the stretchable polyester is stretched and then, after a load is removed, the stretchable polyester exhibits elasticity.

<6> The stretchable polyester according to any one of <1> to <5>, wherein the crystal structure is orientation-treated by stretching.

<7> The stretchable polyester according to <5> or <6>, wherein the crystal structure is orientation-treated by stretching of 2 to 20-fold.

<8> The stretchable polyester according to any one of <1> to <7>, wherein the stretchable polyester comprises a lamellar crystal structure and an amorphous structure, and exhibits a unique stretched chain structure during stretching, and wherein when a tensile load is removed, the stretched chain structure is significantly reduced or disappearing.

<9> The stretchable polyester according to any one of <1> to <8>, wherein the stretched chain structure is a plane zigzag structure.

<10> The stretchable polyester according to any one of <1> to <9>, wherein the lamellar crystal structure is formed from a folding having a spiral structure.

<11> The stretchable polyester according to any one of <1> to <10>, wherein the two or more types of monomer units are a combination of two or more types of monomer units having different main chain lengths.

<12> The stretchable polyester according to any one of <1> to <11>, wherein the polyester contains a 3-hydroxybutyrate unit as a monomer unit.

<13> The stretchable polyester according to <12>, wherein the polyester contains a 4-hydroxybutyrate unit as a monomer unit.

<14> The stretchable polyester according to <13>, wherein a proportion of the 4-hydroxybutyrate unit with respect to all monomer units is from 10 mol % to 30 mol %.

<15> The stretchable polyester according to any one of <1> to <14>, wherein a weight average molecular weight determined by gel permeation chromatography measurement, calibrated with polystyrene, is from 100,000 to 3,000,000.

<16> The stretchable polyester according to any one of <1> to <15>, wherein the stretchable polyester is biodegradable.

<17> The stretchable polyester according to any one of <1> to <16>, wherein the stretchable polyester is bioabsorbable.

<18> The stretchable polyester according to any one of <1> to <17>, wherein the stretchable polyester is derived from biosynthesis or derived from chemical synthesis.

<19> A film which comprises the stretchable polyester according to any one of <1> to <18>.

<20> A fiber which comprises the stretchable polyester according to any one of <1> to <18>.

<21> A molded product which comprises the stretchable polyester according to any one of <1> to <18>.
<22> A method for producing the stretchable polyester according to any one of <1> to <18>, which comprises:
stretching by, after crystallization, subjecting an aliphatic copolymer polyester containing two or more types of monomer units to an orientation treatment by stretching; and
unloading by removing a tensile load of the polyester orientation-treated by the stretching.
<23> The method according to <22>, wherein a form of the stretchable polyester to be produced is a film, a fiber, or a molded product.

Advantageous Effects of Invention

The aliphatic stretchable polyester of the present invention can be deformed by a stretching treatment and can exhibit elastic response by unloading, and has shape followability and flexibility due to the elastic response even when a crosslinking agent is not added. By using the stretchable polyester of the present invention which has not been put to practical use so far, it becomes possible to produce an apparatus or device that has elasticity and that is environmentally degradable or bioabsorbable.

EMBODIMENTS FOR CARRYING OUT THE INVENTION

Figure 1:
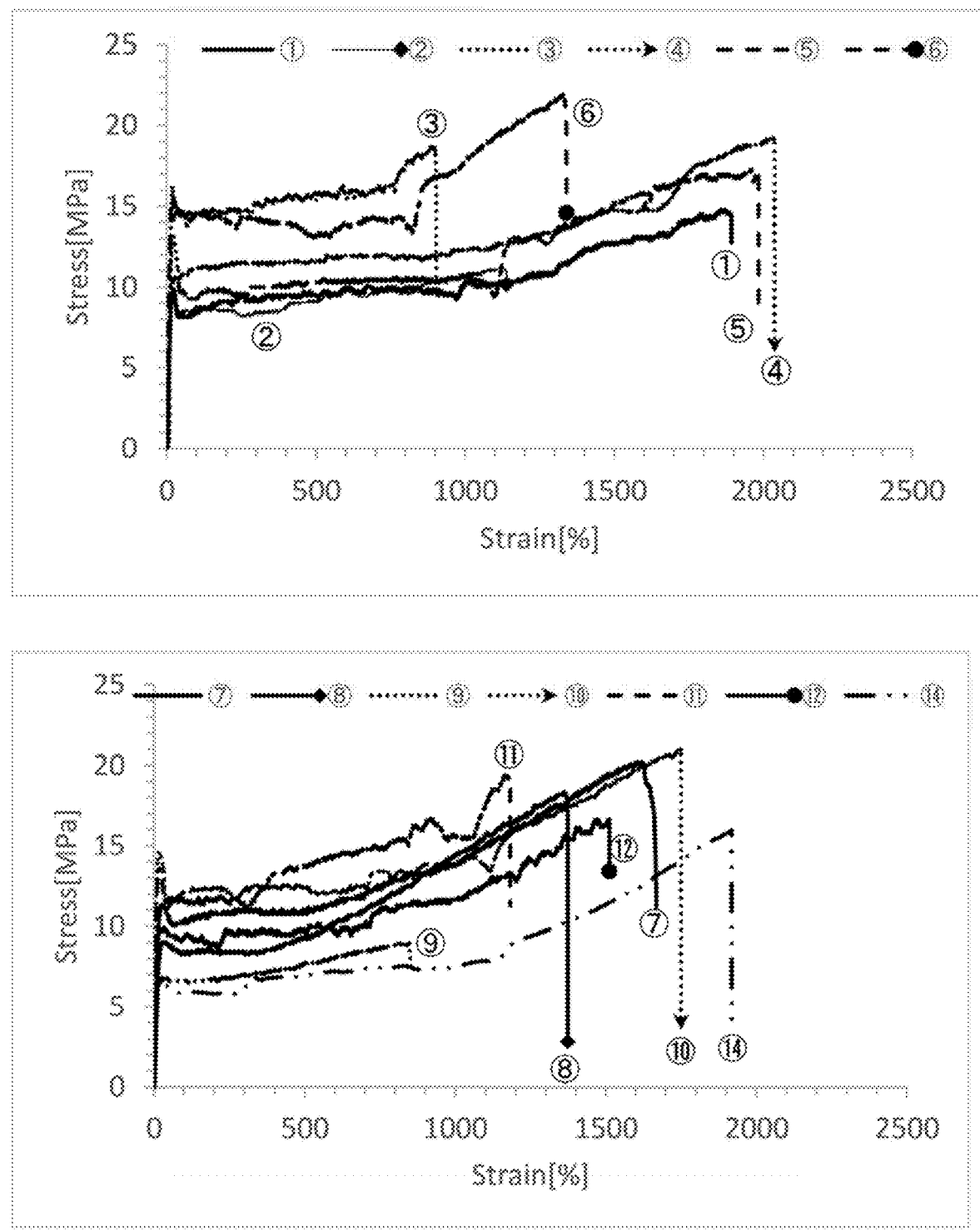
FIG. 1 illustrates stress-strain curves of tensile test for films of Production Examples 1 to 12 and 14.
Figure 2:
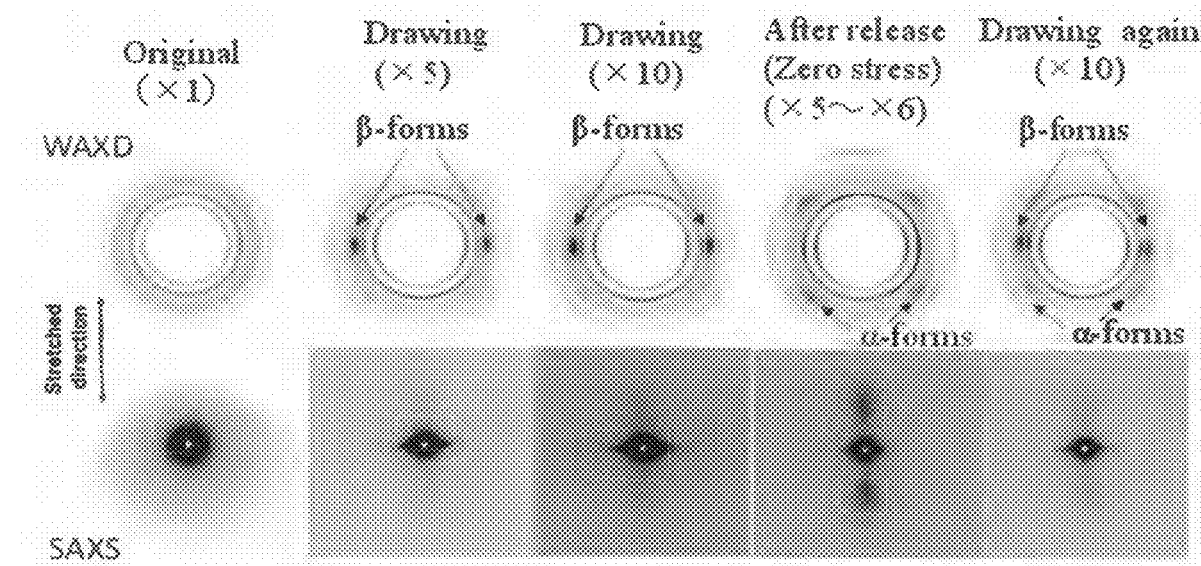
FIG. 2 shows results of WAXD measurement and SAXS measurement of a film molded product of a sample of Production Example 1. The upper side shows the WAXD measurement, and the bottom side shows the SAXS measurement. Original shows a film molded product before stretching, ×5 shows during 5-fold stretching, ×10 shows during 10-fold stretching, after release shows after unloading, and stretching again shows during restretching.
Figure 3:
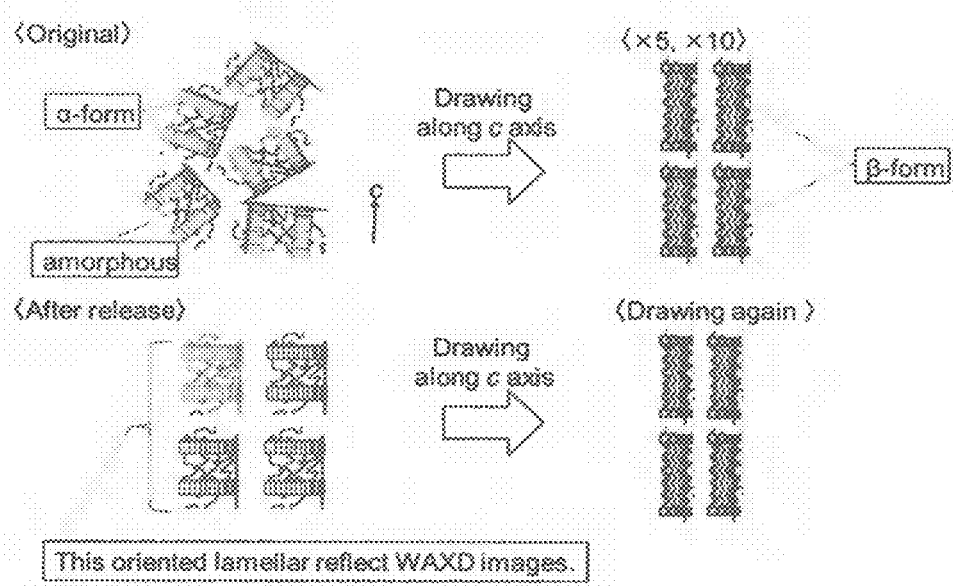
FIG. 3 shows α crystal structure change in a PHA polymer. When the PHA polymer is unstretched, the α-forms (α crystal) in the molded product are in an orientation state that is random; however, orientation is achieved by stretching, and a β-form, in which amorphous chains in between the α-forms are stretched chains, is formed. When a load is removed, the β-form part in between the α-forms returns to amorphous while the orientation of the α-forms is maintained. As a result, a peak is present on the (121) plane. When the PHA polymer is restretched, the amorphous part returns again to the β-form that is a stretched chain, and when re-unloaded, the part returns to the amorphous.

The present invention will be described in detail below. Note that the following embodiments are examples for describing the present invention, and the present invention is not limited only to the embodiments.

[Polyester]

The polyester of the present invention is a stretchable polyester which is an aliphatic copolymer polyester containing two or more types of monomer units, wherein the stretchable polyester contains an α-form and an amorphous structure, and a degree of orientation determined by X-ray of the α-form is 50% or greater.

By using an aliphatic copolymer polyester containing two or more types of monomer units and containing the α-form and the amorphous structure, the stretchable polyester of the present invention can have shape followability and flexibility.

Furthermore, the stretchable polyester of the present invention can suppress deterioration over time due to secondary crystallization without addition of, for example, a nucleating agent.

The polyester of the present invention contains two or more types of monomer units, and preferably the two or more types of monomer units are a combination of two or more types of monomer units having different main chain lengths. As the polymer unit, a 3-hydroxybutyrate unit is preferably contained. As the polymer unit, a 4-hydroxybutyrate unit is preferably contained in addition to the 3-hydroxybutyrate unit.

The weight average molecular weight determined by gel permeation chromatography, calibrated with polystyrene, is preferably 100000 or greater, more preferably 200,000 or greater, even more preferably 300,000 or greater, 400,000 or greater, or 500,000 or greater. The weight average molecular weight determined by gel permeation chromatography, calibrated with polystyrene, may be 600,000 or greater, 700,000 or greater, 800,000 or greater, 900,000 or greater, 1,000,000 or greater, 1,100,000 or greater, 1,200,000 or greater, 1,300, 000 or greater, 1,400,000 or greater, 1,500,000 or greater, 2,000,000 or greater, 3,000,000 or greater, or 4,000,000 or greater. The upper limit of the weight average molecular weight determined by gel permeation chromatography, calibrated with polystyrene, is not particularly limited and is typically 20,000,000 or less, 10,000,000 or less, 8,000,000 or less, 7,000,000 or less, 6,000,000 or less, 5,000,000 or less, 4,000,000 or less, or 3,000,000 or less. However, considering reduction in molecular weight due to pyrolysis and excessively high viscosity at the time of melting, in a case where melt molding is performed, the weight average molecular weight determined by gel permeation chromatography, calibrated with polystyrene, is preferably 400,000 or greater and 2,500,000 or less, more preferably 500,000 or greater and 2,200,000 or less, and even more preferably 600,000 or greater and 2,000,000 or less.

The aliphatic stretchable polyester of the present invention contains, as a polymerization unit, preferably a 3-hydroxybutyrate unit, and more preferably a 3-hydroxybutyrate unit and a 4-hydroxybutyrate unit. In a case where the polyester of the present invention contains a 3-hydroxybutyrate unit, and in a case where the polyester of the present invention contains a 3-hydroxybutyrate unit and a 4-hydroxybutyrate unit, another polymerization unit besides the 3-hydroxybutyrate unit and the 4-hydroxybutyrate unit may be contained as a polymerization unit. Examples of such another polymerization unit include lactate (LA), glycolate (GA), 3-hydroxypropionate (3HP), 3-hydroxyvalerate (3HV), 5-hydroxyvalerate (5HV), 5-hydroxyhexanoate (5HH), 6-hydroxyhexanoate (6HH), 3-hydroxyhexanoate (3HH), and hydroxyalkanoate having 7 or more carbons. Furthermore, not as a bipolymer but a terpolymer or multicomponent copolymer containing the polymerization unit(s) described above can be also used. Furthermore, the copolymer composition described above can be mixed at a freely selected proportion and used.

In the present invention, the 3-hydroxybutyrate unit and the 4-hydroxybutyrate unit are represented by the following formulas.

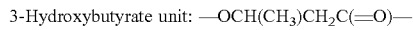

3-Hydroxybutyrate unit: —OCH(CH$_3$)CH$_2$C(=O)—

4-Hydroxybutyrate unit: —OCH$_2$CH$_2$CH$_2$C(=O)—

In a case where the stretchable polyester of the present invention contains a 4-hydroxybutyrate unit, the proportion of the 4-hydroxybutyrate unit with respect to all monomer units is preferably from 10 mol % to 30 mol %. The proportion of the 4-hydroxybutyrate unit with respect to all monomer units may be 11 mol % or greater, 12 mol % or greater, 13 mol % or greater, 14 mol % or greater, 15 mol % or greater, or 16 mol % or greater, and may be 17 mol % or greater, 18 mol % or greater, 19 mol % or greater, or 20 mol % or greater. The proportion of the 4-hydroxybutyrate unit with respect to all monomer units may be 30 mol % or less, 29 mol % or less, 28 mol % or less, 27 mol % or less, 26 mol % or less, 25 mol % or less, 24 mol % or less, 23 mol % or less, 22 mol % or less, or 21 mol % or less.

The proportion of the 4-hydroxybutyrate unit relative to all monomer units can be measured in accordance with the method described in Examples below.

The polyester of the present invention may be any one selected from a random polymer, a block polymer, an alternating polymer, or a grafted polymer, but is preferably a random polymer.

Although P (3HB-co-4HB) is known to have extensibility and flexibility, in the present invention, it was found that, after the copolymer described above is subjected to a certain period of time of crystallization and then deformed by stretching, elasticity is imparted by elastic deformation while extensibility is exhibited. Furthermore, according to a preferred embodiment of the present invention, it was found that deterioration over time due to secondary crystallization is suppressed.

Preferably, the stretchable polyester of the present invention contains an α-form and an amorphous structure, and the degree of orientation determined by X-ray of the α-form is 50% or greater. The degree of orientation determined by X-ray can be calculated in accordance with the method described in "Calculation of Degree of Orientation" in Examples described below.

The degree of orientation determined by X-ray of the α-form is only required to be 50% or greater, and may be 55% or greater, 60% or greater, 65% or greater, 70% or greater, 75% or greater, 80% or greater, and 85% or greater. The upper limit of the degree of orientation determined by X-ray of the α-form is not particularly limited, and typically is 95% or less, and may be 90% or less.

Preferably, the stretchable polyester of the present invention has elasticity. The elasticity is a property by which, after a polyester, which is an elastic body, is stretched by application of an external force, the polyester returns to its original state when the external force is removed. The polyester of the present invention has elasticity with a tensile elongation recovery rate of 20% or greater and 100% or less. The lower limit of the tensile elongation recovery rate may be 25% or greater, 30% or greater, 35% or greater, 40% or greater, 45% or greater, or 50% or greater. The upper limit of the tensile elongation recovery rate is not particularly limited and may be 95% or less, 90% or less, 85% or less, or 80% or less.

In a case of fibers, the tensile elongation recovery rate refers to a tensile elongation recovery rate of a case where evaluation was performed by the method described in "Elasticity Evaluation: Fiber" in Examples described below. That is, by using a tensile tester, a fiber having a length of 3 cm and a fiber diameter of approximately 0.1 to 0.3 mm is subjected to a cycle test under a condition at a temperature of 23° C. and an initial length of 10 mm. Stretching is performed at a tensile speed of 20 mm/min to a strain of 100% (20 mm, which is a length that is twice the initial length, i.e., displacement length of 10 mm), then the gripper is moved to the original length at the same speed to shrink the fiber, and this operation is repeated. When the displacement length is X mm at the beginning of the second stretching (i.e., substantially the same at the time of completion of the first shrinkage), the tensile elongation recovery rate R (%) is expressed by $$R = [(20-(X+10))/10] \times 100.$$

In a case of a cast film, the tensile elongation recovery rate refers to a tensile elongation recovery rate of a case where evaluation was performed by the method described in "Elasticity Evaluation: Film" in Examples described below. That is, by using a tensile tester, a film cut into a length of 3 cm and a width of 3 mm is subjected to a cycle test under a condition at a temperature of 23° C. and an initial length of 10 mm. Stretching is performed at a tensile speed of 20 mm/min to a strain of 1000% (110 mm, which is a length that is 11 times the initial length, i.e., displacement length of 100 mm), then the gripper is moved to the original length at the same speed to shrink the film, and this operation is repeated. The cast film is an unstretched film and corresponds to the invention of the present application at the point when the first stretching operation in the tensile test (stretching to the displacement length of 100 mm) is completed. When the displacement length is y mm at the beginning of the second stretching (i.e., substantially the same at the time of completion of the first shrinkage), the deemed tensile elongation recovery rater (%) based on the displacement length of 0 mm of the unstretched film is expressed by $$r=[(110-(y+10))/100]\times 100.$$

However, the present invention is a stretchable polyester, and when the displacement length of 0 mm of the film after the initial stretching is set as the reference,
the tensile elongation recovery rate R (%) is expressed by $R=r_2/r_1\times 100$. Note that $r_1$ is the deemed tensile elongation recovery rate after the first stretching, and $r_2$ is the deemed tensile elongation recovery rate after the second stretching.

As described in Examples below, the stretchable polyester of the present invention can exhibit elasticity after crystallization followed by performing stretching and unloading. In the polyester of the present invention, the crystal structure is orientation-treated by the stretching described above. As the stretching treatment, stretching of 2 to 20-fold is preferably performed, stretching of 2 to 15-fold is more preferably performed, and stretching of 2 to 10-fold is more preferably performed (e.g., stretching of 2-fold, 5-fold, or 10-fold) in a range that breakage does not occur. Stretch ratio and the number of stretching can be appropriately adjusted based on the required stretching width.

The stretchable polyester of the present invention preferably contains a lamellar crystal structure (structure formed from a folding having a spiral structure; also referred to as an α-form) and an amorphous structure, exhibits a unique stretched chain structure (plane zigzag structure; also referred to as a β-form) during stretching, and when the load is removed, the stretched chain structure is significantly reduced or disappears.

The measurement of the stretched chain structure (β-form) can be performed by wide-angle X-ray diffraction measurement and small-angle X-ray scattering measurement described in Examples below. In the stretchable polyester of the present invention, preferably, the β-form is detected by wide-angle X-ray diffraction measurement and small-angle X-ray scattering measurement in the stretched state, and the α-form is significantly reduced compared to the stretched state or no β-form is detected by the wide-angle X-ray diffraction measurement and the small-angle X-ray scattering measurement in the unloaded state.

In the polyester of the present invention after the load of stretching is removed, the stretched chain structure is preferably not detected by the wide-angle X-ray diffraction measurement; however, the signal derived from the stretched chain structure after the unloading is only required to be reduced.

The degree of crystallinity of the stretchable polyester of the present invention is not particularly limited and is preferably 10% or greater, and may be 20% or greater, 30% or greater, or 40% or greater. The upper limit of the degree of crystallinity is not particularly limited and is typically 80% or less.

The stretchable polyester of the present invention is preferably biodegradable, and more preferably bioabsorbable. Biodegradable means capability of being decomposed by microorganisms or enzymes in the natural environment (e.g., soil, compost, lakes and marshes, and sea water) or decomposed into non-toxic components in vivo. Bioabsorbable means capability of being metabolized by organisms, such as humans and animals.

The present invention is a stretchable polyester having shape followability and flexibility by elastic response and being able to suppress deterioration over time due to secondary crystallization without addition of, for example, a crosslinking agent or a nucleating agent but, as long as the physical properties of the stretchable polyester is not deteriorated, these can be also added.

[Method for Producing Polyester]

In general, methods of synthesizing PHAs include fermentation synthesis methods (biosynthesis methods) and chemical synthesis methods. The method of producing the aliphatic polyester of the present invention may be a fermentation synthesis method (biosynthesis method) or a chemical synthesis method, but a fermentation synthesis method (biosynthesis method) is more preferred to obtain a polyester having a greater molecular weight.

A chemical synthesis method is a method of chemically synthesizing PHAs in accordance with a typical organic synthesis technique. Specific examples of the chemical synthesis method include synthesis of P(3HB-co-6HHx) by subjecting fatty acid lactone, such as (R)-β-butyrolactone or ε-caprolactone, to ring-opening polymerization in the presence of a catalyst (Abe et al., Macromolecules, 28, 7630 (1995)), synthesis of P(3HB-co-4HB) or the like by subjecting fatty acid lactone, such as (R)-β-butyrolactone or γ-butyrolactone, to ring-opening polymerization in the presence of a catalyst (Hori et al., Polymer, 36, 4703 (1995)), and synthesis of P(GA-co-LA) or the like by subjecting glycolide and lactide and the like to ring-opening polymerization in the presence of a catalyst (Gilding et al., Polymer 20, 1459 (1979)).

A fermentation synthesis method (biosynthesis method) is a method of biosynthesizing PHAs in accordance with a typical fermentation engineering technique. As the fermentation synthesis, specifically for example, a polyester containing 4HB of the present invention can be produced by culturing microorganisms having a P(3HB)-producing capability in the presence of ε-caprolactone (another name: 6-hexanolactone) or 6-hydroxyhexanoate, which is a saponified product thereof, or a salt thereof, γ-butyrolactone or 4-hydroxybutyrate, which is a saponified product thereof, or a salt thereof, a butyric acid derivative such as 4-chlorobutyrate or 4-bromobutyrate, or an even-chain α,ω-alkanediol having 4 or more carbons such as 1,4-butanediol, 1,6-hexanediol, 1,8-octanediol, 1,10-decanediol, or 1,12-dodecanediol as a carbons source (Saito et al., Polymer International 39, 169 (1996), and WO 2019/044837).

As the microorganisms having a P(3HB)-producing capability, microorganisms, which are known to synthesize P(3HB), of the genera of *Cupriavidus, Alcaligenes, Ralstonia, Delftia, Comamonas, Hydrogenophaga, Burkholderia, Escherichia, Azotobacter, Methylobacterium, Paracoccos, Acinetobacter, Aeromonas, Allochromatium, Azorhizobium, Bacillus, Caulobacter, Chromobacterium, Ectothiorhodospira, Klebsiella, Nocardia, Pseudomonas, Rhodobacter,*

*Rhodococcus, Rhodospirillum, Rickettsia, Sinorhizobium, Sphingomonas, Synechocystis, Thiococcus, Thiocystis, Vibrio,* and *Wautersia* can be used. Among these, genus *Cupriavidus* is preferred, and *Cupriavidus necator* is more preferred. For example, *Cupriavidus necator* 1116 strain (ATCC17699) can be used.

Note that, with the *Cupriavidus necator* H16 wild-type strain, 3HB, 3HV, 3HP, 4HB, 5HV or the like can be adequately incorporated into PHA. Use of genetically modified bacteria, in which a PHA polymerase gene having a different substrate specificity has been introduced, enables polymerization of another hydroxy acid into the PHA. Thus, as described above, in addition to the *Cupriavidus necator* H16 strain, genetically modified strains and microorganisms having or imparted a PHA-polymerizing capability also can be used, which include other genera of *Cupriavidus, Alcaligenes, Ralstonia, Delftia, Comamonas, Hydrogenophaga, Burkholderia, Escherichia, Azotobacter, Methylobacterium, Paracoccos, Acinetobacter, Aeromonas, Allochromatium, Azorhizobium, Bacillus, Caulobacter, Chromobacterium, Ectothiorhodospira, Klebsiella, Nocardia, Pseudomonas, Rhodobacter, Rhodococcus, Rhodospirillurn, Rickettsia, Sinorhizobium, Sphingomonas, Synechocystis, Thiococcus, Thiocystis, Vibrio,* and *Wautersia.*

The pH of the culture medium is typically approximately 4 to approximately 10, preferably approximately 5 to approximately 8, and more preferably approximately 5.8 to approximately 7.5. The culture temperature is typically from 15° C. to 45° C., preferably from 20° C. to 40° C., and more preferably from 25° C. to 38° C. The culture method may be any one of batch culture, fed-batch culture, or continuous culture.

The medium component is not particularly limited as long as it is a substance that can be assimilated by the microorganisms to be used.

As the carbon source, for example, organic carbon sources, including saccharides such as arabinose, glucose, mannose, fructose, and galactose, sugar alcohols such as sorbitol, mannitol, and inositol, alcohols such as methanol, ethanol, and butanol, acetic acid, butyric acid, fatty acids, and plant oils; inorganic carbon sources such as carbon dioxide; and natural materials such as yeast extract, molasses, peptone, and meat extract can be used.

As the nitrogen source, for example, inorganic nitrogen compounds, such as ammonia, ammonium salts (ammonium chloride, ammonium sulfate, ammonium phosphate), and nitrate; and/or organic nitrogen-containing substances, such as urea, corn steep liquor, casein, peptone, yeast extract, and meat extract can be used.

Examples of the inorganic component include calcium salts, magnesium salts, potassium salts, sodium salts, phosphate, manganese salts, zinc salts, iron salts, copper salts, molybdenum salts, cobalt salts, nickel salts, chromium salts, boron compounds, and iodine compounds. More specific examples thereof include monopotassium phosphate, dipotassium phosphate, magnesium phosphate, magnesium sulfate, and sodium chloride.

Examples of other organic nutrient source include amino acids, such as glycine, alanine, serine, threonine, and proline; and vitamins, such as vitamin B1, vitamin B12, folic acid, and vitamin C.

As methods of producing 4HB-containing PHA, a method of culturing by adding a precursor that can be a 4HB-CoA into a PHA-producing wild strain, and a method of introducing a supply path of 4HB-CoA by genetic transformation. In the present invention, a method of culturing by adding a precursor that can be a 4HB-CoA into a PHA-producing wild strain may be employed, or a supply path of 4HB-CoA by genetic transformation may be introduced. As the precursor that can be 4HB-CoA, for example, ε-caprolactone (another name: 6-hexanolactone) or 6-hydroxyhexanoate, which is a saponified product thereof, or a salt thereof, γ-butyrolactone or 4-hydroxybutyrate, which is a saponified product thereof, or a salt thereof, a butyric acid derivative such as 4-chlorobutyrate or 4-bromobutyrate, or an even-chain α,ω-alkanediol having 4 or more carbons such as 1,4-butanediol, 1,6-hexanediol, 1,8-octanediol, or 1,10-decanediol are known. By culturing microorganisms having a P(3HB)-synthesizing capability in the presence of the precursor, the 4HB-containing PHA can be produced (WO 2019/044837, and Polymer International 39, 169-174 (1996)). The used amount of the precursor that can be 4HB-CoA is not particularly limited. The precursor can be supplied batch-wisely, continuously, or intermittently to a degree that does not cause growth inhibition. In general, by changing the used amount, used concentration, supply rate, and the like of these precursors, the proportion of 4HB in PHA can be changed. A method of producing 4HB-containing PHA by incorporating a 4HB-CoA supply path and a PHA synthesis path into *Escherichia coli* using a carbon source that is structurally different from 4HB by genetic transformation, described by Li et al. (Metabolic Engineering, Volume 12, 352-359 (2010)) can also be used.

As the fermentation synthesis method for producing PHAs containing monomer units other than 3HB or 4HB, a method of incorporating 3HV, 3HP, or 51-IV monomer units by using propionic acid, valeric acid, 1,3-propanediol, 1,5-pentanediol, propanol, or pentanol; or a method of incorporating 3HH monomer units by using microorganisms carrying a PHA polymerase with a wide substrate specificity enabling recognition of 3HB-CoA and 3HH-CoA and by using a carbon source that can supply 3HH-CoA through β-oxidation pathway can also be used. Furthermore, a transgenic bacteria that can change the substrate specificity of a PHA polymerase by gene replacement and can incorporate lactic acid, glycolic acid, or 3HH monomer units can be also used. By using a combination of a method of producing 4HB-containing PHA and a method of introducing such other monomer units, not only a bipolymer, such as P(3HB-co-3HV), P(3HB-co-3HP), P(3HB-co-4HB), P(3HB-co-3HH), P(3HB-co-5HV), P(3HB-co-6HH), P(3HB-co-LA), and P(3HB-co-GA) but also a terpolymer or multicomponent copolymer having a combination of 3HB, 3HV, 3HP, 3HH, 4HB, 5HV, 6HH, LA, GA or a long-chain hydroxyalkanoate can be fermentation synthesized.

So-called non-growth-associated PHA production, in which bacterial cells are grown prior to culture for PHA production and, in the later stage, accompanying medium replacement or growth, transferred into a PHA accumulation condition with restricted nutrients, such as a phosphorus source or nitrogen source, can be performed, or growth-associated production, in which growth of bacterial cells and accumulation of PHA are simultaneously performed, can be performed.

From the culture solution obtained by culture in accordance with the description above, dried bacterial cells can be obtained by separating and collecting the bacterial cells by a typical solid-liquid separation means, such as filtration and centrifugal separation, then washing and drying the bacterial cells. PHA can be collected by a common method, for example, including extracting a produced polyester from the dried bacterial cells with an organic solvent such as chloroform, and adding a poor solvent such as hexane into this extracted liquid to precipitate the PHA.

Alternatively, PHA can be also collected by removing components other than the PHA by subjecting the collected bacterial cells to a known method including physical crushing treatment such as high-pressure homogenizer or ultrasonic treatment, alkali treatment using sodium hydroxide, potassium hydroxide, or sodium hypochlorite, surfactant treatment, enzyme treatment using protease, lysozyme, or lipase, oxygen treatment with an oxidizing agent such as hydrogen peroxide, washing with a solvent such as methanol, ethanol, or acetone, and drying.

[Production of Elastic Molded Product]

By using the PHA described above as a raw material, melt processing such as melt-spinning, melt-extrusion, and injection molding can be performed. By subjecting such a molded product to heat-treatment crystallization and then stretching, fibers, films, and molded products having rubber elasticity can be obtained.

As the melting conditions, a melting temperature of 100° C. to 220° C., a melting time of 20 minutes or less, and a mold temperature or winding temperature in a range of 5° C. to 50° C. are desired for production processing. Crystallization treatment is performed on the fibers, films, and molded products that have undergone the melt processing described above. As the conditions for this crystallization treatment, when the crystallization temperature is in a range of 20° C. to 120° C. and the crystallization time is in a range of 1 minute to 120 minutes, the next stretching process can be then performed.

When a molded product such as a film is formed by a solvent casting method, crystallization simultaneously occurs at the time of vaporization of a solvent, and thus next stretching process can be then performed.

The rubber elasticity is exhibited by stretching the crystallized fibers, films, or molded products at a stretch ratio of 2-fold or greater (e.g., 5-fold or greater).

For example, when a fiber that is melted at a melting temperature of 180° C. for 5 minutes and then wound at 23° C. is crystallized at 23° C. for 30 minutes and stretched to approximately 5-fold, a fiber having rubber elasticity can be produced.

When the length of a fiber after production through melt-spinning, crystallization, and stretching is 100% (100% is a length at the time when all the processes are completed, and not before the stretching), elongation is possible to approximately 200% (100% strain) without breakage. By unloading thereafter, a property that allows the strain to be recovered to roughly from 130 to 150% (from 30 to 50% strain) is achieved, and a elongation recovery rate (%) is from approximately 70% to approximately 50%. Adjustment is only required to be performed to a required stretching width by appropriately adjusting the stretch ratio and the number of stretching.

Alternatively, a film exhibiting rubber elasticity can be produced by subjecting a film, which has been melt-molded by hot pressing at 180° C. for 2 to 5 minutes, to crystallization at 23° C. for 60 minutes and then stretching the film to 2 to 10-fold.

When the length of a film after production through melt-molding, crystallization, and stretching is 100% (100% is a length after shrinkage after stretching), elongation is possible to approximately 200% (100% strain) without breaking. By unloading thereafter, a property that allows the strain to be recovered to roughly 140% (40% strain) is achieved.

The fibers and films produced as described above can maintain excellent elastic response even after storage for a long period of time of half a year or longer, and are molded products in which deterioration over time due to secondary crystallization is suppressed.

The present invention will be described more specifically hereinafter using production examples and examples, but the present invention is not particularly limited to the following Examples.

EXAMPLES

[Production of Polymer (Jar Culture)]

Production Example 1

PHA was Produced by Using *Cupriavidus necator* 1116 Strain (ATCC17699).

A medium obtained by adding 14.24 g/L of fructose into a sterilized medium 1 including 2.72 g/L of $KH_2PO_4$, 4.26 g/L of $Na_2HPO_4$, 0.3 g/L of $NaHCO_3$, 2 g/L of $(NH_4)_2SO_4$, 0.2 g/L of $MgSO_4.7H_2O$, 0.2 g/L of a yeast extract, and 3.5 mL of a mineral solution described below was subjected to shaking culture in a test tube at 30° C. for 24 hours to obtain a pre-preculture solution.

Mineral solution: 6 g/L of $FeC_6H_5O_7.xH_2O$, 2 g/L of $ZnSO_4.7H_2O$, 0.1 g/L of $CuSO_4.5H_2O$, 1 g/L of $MnCl_2.4H_2O$, 0.1 g/L of KI, 0.1 g/L of $(NH_4)_6Mo_7O_{24}.4H_2O$, 0.1 g/L of $CoCl_2.6H_2O$, 0.2 g/L of $H_3BO_3$, 5 g/L of NaCl, and 4 g/L of $CaCl_2.2H_2O$ are dissolved in water.

In an Erlenmeyer flask having a volumetric capacity of 500 mL and containing 100 mL of a medium obtained by adding 14.24 g/L of fructose to the aforementioned medium 1, a medium obtained by adding 8.86 g/L of fructose and 5.38 g/L of ε-caprolactone to the medium 1, or a medium obtained by adding 8.86 g/L of fructose and 5.38 g/L of γ-butyrolactone to the medium 1, 1 mL of the pre-preculture solution was inoculated and cultured at 30° C. and 150 rpm for 48 to 96 hours to obtain a mother culture (preculture solution).

In a 3 L jar fermenter, 2 L of a medium was prepared by changing $(NH_4)_2SO_4$ of the medium 1 to be 7.5 g/L. After the medium was sterilized, 100 mL of the mother culture was inoculated into the medium, and then fed-batch process using a 42 mass % fructose and γ-butyrolactone was started aseptically through a sterilizing filter (PTFE 0.2 μm pore). Feed rate and feed ratio of the carbon source can be set appropriately. To prevent termination of the bacterial cell proliferation caused by excessive amount of residual carbon source that was not used up by the bacterial cells in the culture vessel, the culture was started at a feed rate of the 42 mass % fructose of approximately from 1 to 2 g/h (0.5 to 1 g/h·L) and at a feed rate of γ-butyrolactone of approximately from 0.2 to 0.5 g/h (0.1 to 0.25 g/h·L) which were low flow rates, and these feed rates were increased stepwise or continuously as the bacterial cells proliferated. The ventilation volume was controlled to from 0.2 to 0.3 L/min, the agitation speed was controlled to from 500 to 700 rpm, the culture temperature was controlled to 36° C., the lower limit of the culture pH was controlled to 6.0, and a 2 N NaOH solution was used as a pH-adjusting alkali. The ratio of γ-butyrolactone:fructose was approximately 0.5. The culture was terminated at 140 hours after the start of the culture.

After the culture, the bacterial cells were collected by centrifugal separation, frozen at −20° C., and then subjected to lyophilization.

The method of extracting and purifying the PHA from the bacterial cells was performed as described below. In a glass Erlenmeyer flask with a screw cap, approximately from 4 to 10 g of the lyophilized bacterial cells were suspended in 400 mL chloroform and subjected to extraction at 30° C. for 24 to 48 hours. The obtained viscous solution was filtered by a filter paper to remove the bacterial cell residue. The obtained clear solution was concentrated to from approximately 100 to 200 mL by an evaporator, and the PHA was precipitated by 5-fold amount of hexane, which was a poor solvent. The obtained white precipitates were washed with ethanol and then vacuum-dried to obtain purified PHA.

Production Example 2

The same procedure as in Production Example 1 was performed except for changing the culture time in the jar culture to 170 hours.

Production Example 3

The same procedure as in Production Example 1 was performed except for changing the culture time in the jar culture to 96 hours.

Production Example 4

The same procedure as in Production Example 1 was performed except for changing the culture time in the jar culture to 120 hours.

Production Example 5

The same procedure as in Production Example 1 was performed except for changing the culture time in the jar culture to 144 hours.

Production Example 6

The same procedure as in Production Example 1 was performed except for using a medium in which $(NH_4)_2SO_4$ was changed to 12.5 g/L in the jar culture, using a 42 mass % fructose solution and ε-caprolactone as carbon sources of the fed-batch, setting the ratio of ε-caprolactone:fructose to approximately 0.4, using a 12.5% ammonia water for the pH-adjusting alkali, and changing the culture time to 149 hours.

Production Example 7

The same procedure as in Production Example 6 was performed except for changing the culture time in the jar culture to 172 hours, and changing the ratio of z-caprolactone:fructose to approximately 0.5.

Production Example 8

The same procedure as in Production Example 6 was performed except for changing the culture time in the jar culture to 172 hours, and changing the ratio of ε-caprolactone:fructose to approximately 0.6.

Production Example 9

The same procedure as in Production Example 6 was performed except for changing the culture time in the jar culture to 205 hours, and changing the ratio of ε-caprolactone:fructose to approximately 0.6.

Production Example 9

The same procedure as in Production Example 6 was performed except for changing the culture time in the jar culture to 205 hours, and changing the ratio of ε-caprolactone:fructose to approximately 0.6.

Production Example 10

The same procedure as in Production Example 1 was performed except for changing the culture time in the jar culture to 114 hours, changing the ratio of ε-caprolactone:fructose to approximately 0.4, and purifying by a combination of high-pressure crushing treatment, alkali treatment, oxidation agent treatment, and solvent washing after the culture.

Production Example 11

The same procedure as in Production Example 10 was performed except for changing the culture time in the jar culture to 111 hours, and changing the ratio of ε-caprolactone:fructose to approximately 0.5.

Production Example 12

The same procedure as in Production Example 10 was performed except for changing the culture time in the jar culture to 113 hours, and changing the ratio of ε-caprolactone:fructose to approximately 0.5.

Production Example 13

The same procedure as in Production Example 10 was performed except for changing the culture time in the jar culture to 113 hours, and changing the ratio of ε-caprolactone:fructose to approximately 0.4.

Production Example 14

The same procedure as in Production Example 6 was performed except for changing the culture time in the jar culture to 113 hours, and changing the ratio of ε-caprolactone:fructose to approximately 0.5.

[PHA Molecular Weight Measurement]

The PHA molecular weight (weight average molecular weight Mw and number average molecular weight Mn) were measured by gel permeation chromatography method as described below. The measurement results of the molecular weights (Mw and Mn) of the PHA of each production example are shown in Table 1 below.

The purified PHA was adjusted to approximately 0.5 mg/mL by adding chloroform and dissolved at 60° C. for 4 hours, and cooled to room temperature. Insoluble substances were filtered and removed by using a PTFE filter having a pore diameter of 0.2 μm to obtain a measurement sample. Conditions for GPC are as shown below.

Instrument: HPLC Prominence system, available from Shimadzu Corporation

Column: Shodex K-806L (two columns in series), available from Showa Denko K.K.

Column temperature: 40° C.

Mobile phase: Chloroform (1 mL/min)

Detector: RI (40° C.)

Standards: Shodex polystyrene molecular weight standards (6870000 to 1270)

Injection amount: 60 μL

Analysis time: 30 minutes

[Analysis of Polymer]
<$^1$H-NMR>

The compositional analysis of the purified PHA of each production example was determined by using a nuclear magnetic resonance spectrometer (ECA 500, JASCO Corporation). The purified PHA was dissolved in CDCl$_3$ in the concentration of 1.5 mass % and used as a measurement sample. The $^1$H-NMR spectrum was measured at 500 MHz at room temperature.

For the PHA of each production example, the 4HB proportion measured by NMR is shown in Table 1 below.

[Measurement of Thermal Properties]

The glass transition temperature (Tg) and the melting point (Tm) were measured by using a differential scanning calorimeter equipped with IntraCooler (DSC8500, Perkin Elmer). The measurement atmosphere was nitrogen (20 mL/min), the temperature was increased from −50° C. to 200° C. at 20° C./min and maintained for 1 minute, and thus the sample was completely dissolved. The dissolved sample was then cooled to −50° C. at 200° C./min and maintained for 3 minutes, and then the temperature was increased again to 200° C. at 20° C./min (this temperature increase was considered as second run). Based on the DSC curve (thermogram) measured by the second run, Tg and Tm were measured. Note that, when the temperature was increased from the rapidly cooled state to the glass state, the baseline is changed upon transition from the glass state to the amorphous stat, and Tg was determined by reading the temperature at which the change occurred. When the temperature increase was further continued, a melting peak (endothermic peak) appeared below as a protruding peak in the DSC curve, and a temperature at the position of the maxima of the peak was taken as Tm. The amount of the sample was approximately 1 mg, and an aluminum sample pan was used. Indium was used for temperature calibration. The measurement results are shown in Table 1 below.

TABLE 1

| | Mw [×10$^4$] | Mn [×10$^4$] | Mw/Mn | 4HB [mol %] | Tg [° C.] | Tm [° C.] |
|---|---|---|---|---|---|---|
| Production Example 1 | 72 | 21 | 3.4 | 18 | −8 | — |
| Production Example 2 | 46 | 14 | 3.3 | 18 | −7 | — |
| Production Example 3 | 100 | 25 | 4.0 | 12 | −6 | 141 |
| Production Example 4 | 88 | 22 | 4.0 | 16 | −6 | — |
| Production Example 5 | 65 | 26 | 2.5 | 17 | −6 | — |
| Production Example 6 | 168 | 69 | 2.4 | 11 | −2 | 124 |
| Production Example 7 | 183 | 28 | 6.5 | 18 | −4 | 141 |
| Production Example 8 | 180 | 30 | 6.0 | 21 | −6 | 133 |
| Production Example 9 | 152 | 34 | 4.5 | 22 | −5 | 116 |
| Production Example 10 | 60 | 13 | 4.6 | 14 | −5 | 142 |
| Production Example 11 | 106 | 24 | 4.4 | 13 | −4 | 151 |
| Production Example 12 | 64 | 16 | 4.0 | 18 | −6 | 142 |
| Production Example 13 | 97 | 21 | 4.6 | 15 | N/A | N/A |
| Production Example 14 | 300 | 96 | 3.2 | 30 | N/A | N/A |

N/A: Undetermined

<Examples 1 to 14?

[Film Crystallization]

The P(3HB-co-4HB) polymers (0.25 g each) obtained in Production Examples 1 to 14 were each dissolved in 10 mL of chloroform, the obtained polymer solution was poured into a Teflon petri dish having a diameter of 5 cm and covered with foil (aluminum foil) with holes, and the solvent was allowed to vaporize roughly over one day, and thus a solvent cast film was produced. The obtained film was allowed to stand still at 23° C. for 1 week to progress crystallization, and thus a PHA cast film was obtained. Note that, in a case where a film is prepared by melt-molding such as hot press, after heating and melting are performed at 180° C. for 2 to 5 minutes, crystallization is performed at 23° C. for approximately 1 minute to 120 minutes, and then stretching can be performed.

[Stretching]

The PHA film obtained as described above was cut into a strip form having a length of 3 cm and a width of 3 mm and stretched to a freely chosen ratio such as 2-fold, 5-fold, or 10-fold, by using a stretching machine at 23° C. The stretching was stopped and unloaded as necessary, and then again stretching operation was repeatedly performed. A film obtained by stretching the PHA cast film produced by using the P(3HB-co-4HB) polymer each obtained in Production Examples 1 to 14 as described above was used as each film of Examples 1 to 14.

[Wide-Angle X-Ray Diffraction (WAXD) Measurement and Small-Angle X-Ray Scattering (SAXS) Measurement]

For the PHA cast film produced from the PHA of each of Production Examples 1 to 12, structural analysis of the film before stretching, during stretching, after unloading, and during restretching was performed by wide-angle X-ray diffraction (WAXD) measurement and small-angle X-ray scattering (SAXS) measurement.

The WAXD measurement and the SAXS measurement were performed by using a synchrotron radiation facility SPring-8, the wavelength of the X-ray was 0.1 nm, and the camera length was 250 mm. The film was set perpendicular to the X-ray beam and parallel to a detector. In the case of SAXS measurement, the wavelength of the X-ray was 0.1 nm, and the camera length was 2500 mm.

The results of the WAXD measurement and the SAXS measurement for the samples of Production Examples 1 to 12 were shown in FIG. 2 and FIGS. 13 to 23. The upper side shows the WAXD measurement, and the bottom side shows the SAXS measurement. Original shows a film molded product before stretching, ×5 shows during 5-fold stretching, ×10 shows during 10-fold stretching, after release or zero stress show after unloading, and stretching again shows during restretching.

In the WAXD measurement, a ring patterned part with a high intensity shows a peak diffracted by the crystal, and a part with a low intensity shows a part derived from amorphous. As a result of the WAXD measurement, in the film molded body before stretching, diffraction of a concentric form (ring pattern) derived from a two spiral structure (α-form) was observed, and the α-form was present randomly. Thus, it was found that the film before the stretching contained the α-form and the amorphous structure (note that, for a polymer, degree of crystallinity of 100% was not impossible, and an amorphous structure was naturally contained). At this point, diffraction derived from a plane zigzag structure (β-form) was not observed. On the other hand, in the WAXD analysis results after 5-fold stretching and 10-fold stretching, the α-form starts being slightly oriented in the stretching direction, but the cycle of the α-form is not uniform. In a case of the 5-fold stretching, 10-fold stretching, and restretching after unloading, diffraction points derived from the β-forms were observed along the WAXD equator, and thus it was found that the β-form (plane zigzag structure) was exhibited by the molecular chains of the amorphous part in between an α-form and an α-form being stretched. The diffraction points derived from the β-forms disappeared in a condition where the tensile load was unloaded and elongation was recovered. Thus, it was conceived that the β-form returned again to random coils in the unloaded state. Even after the unloading and shrinking, diffraction points derived from the oriented α-forms caused by the first stretching were observed, and it was found that the α-form stayed oriented. After the unloading and shrinking, diffraction points derived from the oriented α-forms were observed in the restretching in which the tensile load was applied again. As described above, it was found that the film after the stretching contained the α-form and the amorphous structure.

As a result of performing the SAXS measurement for these films, in the film from which the load was released, a drop-like pattern was observed along a meridian parallel to the stretching direction. This shows that the lamellar crystals have a specific cycle and are oriented with respect to the stretched direction. From the results of the WAXD, a ring pattern derived from the lamellar crystal occurred before the stretching, and when this is stretched, appearance of cross orientation of the crystal formed from the α-form, and appearance of the β-form were observed, and upon unloading, lowering of the degree of orientation and disappearance of the n-form were observed. From the results of the SAXS, no clear scattering peaks (random orientation of layered lamellar) were present before the stretching, and scattering appeared along the meridian in the stretching process and a clear drop-like scattering pattern along the meridian observed for the film after the unloading were observed. From the results described above, it is conceived that, in the film, the layered lamellar structure present before the stretching is rotated by the stretching and oriented horizontally or vertically to the stretched direction. It is conceived that, at this time, due to increase in the stretch ratio, tie molecular chains present in between the lamellar crystals are in a state of tension and gathered, whereby the β-form (strong diffraction along the equator of WAXD) appears. Since this β-form is not in a stable condition, when the state of tension is released, it is expected that the β-form is dissolved and returns to the normal tie molecular chain. Furthermore, after the unloading, the whole body shrinks due to rubber elasticity. Since the higher order structure formed from the lamellar crystals can be dynamically rearranged at this time, formation of a structure with a certain degree of cyclicity is expected. This is the reason why the strong scattering pattern is observed along the meridian by the SAXS measurement of the film after the unloading.

[Calculation of Degree of Orientation]

Figure 24:
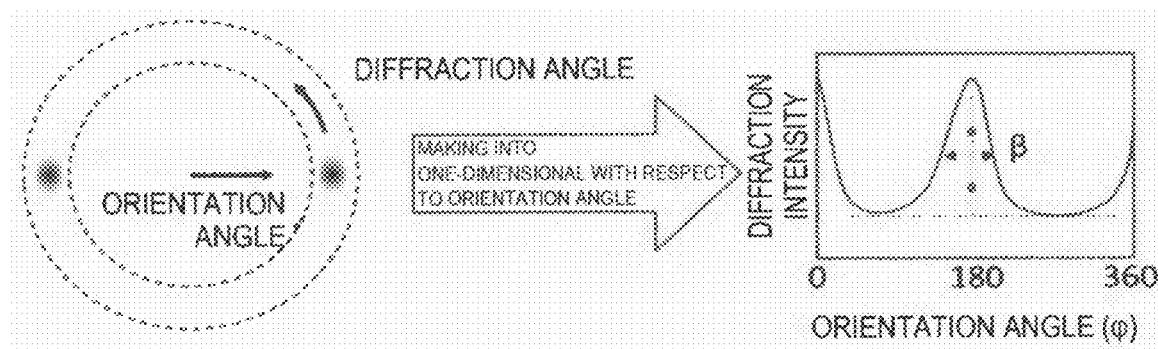
FIG. 24 is a drawing illustrating the method of calculating a degree of orientation.

A region including a particular diffraction point (this time, (020) plane) in the WAXD image measured by the wide-angle X-ray diffraction (WAXD) described above was selected in a ring form, all the diffraction intensities having the same orientation angle were integrated, the intensity was plotted with respect to the orientation angle, and thus an orientation angle one-dimensional profile was created. At the spot where the diffraction point exists, a normal distribution-like curve having a peak can be obtained. The full width at half maximum (FWHM; peak width at the half height of the peak) was measured (see FIG. 24). When the full width at half maximum is f3, the degree of orientation F [%] can be expressed by $$F=(180-\beta)/180\times100[\%]$$

The results of measuring the degree of orientation [%] of the films of Examples 1 to 12 are shown in Table 2.

TABLE 2

| | Before stretching (unstretched) | During stretching (×10) | Unloading (×5 to ×6) | Restretching (×10) |
|---|---|---|---|---|
| Example 1 | — | 84 | 86 | 86 |
| Example 2 | — | 89 | 75 | 85 |
| Example 3 | — | 82 | 78 | 84 |
| Example 4 | — | 80 | 89 | 87 |
| Example 5 | — | 89 | 87 | 89 |
| Example 6 | — | 79 | 86 | 83 |
| Example 7 | — | 74 | 56 | 82 |
| Example 8 | — | 82 | 85 | 88 |
| Example 9 | — | 76 | 78 | 85 |
| Example 10 | — | 72 | 66 | — |
| Example 11 | — | 69 | 89 | 79 |
| Example 12 | — | 67 | 77 | 73 |

—: Measurement was not possible

[Tensile Test: Film]

The PHA film cut into a strip form having a length of 3 cm and a width of 3 mm was subjected to a tensile test until breakage of the film by using a tensile tester AGS-X or EZ-Test (available from Shimadzu Corporation) at a temperature of 23° C., a test speed of 20 mm/min, and an initial length of 10 mm. Note that, in the length of 3 cm in the length direction, regions that are 1 cm from edges of the film were used to fix the film, and the part used for the tensile test was 1 cm (10 mm) at the center, and the 10 mm part was used as the initial length. The results of stress-strain curves are shown in FIG. 1.

[Evaluation of Elasticity of Film]

Figure 4:
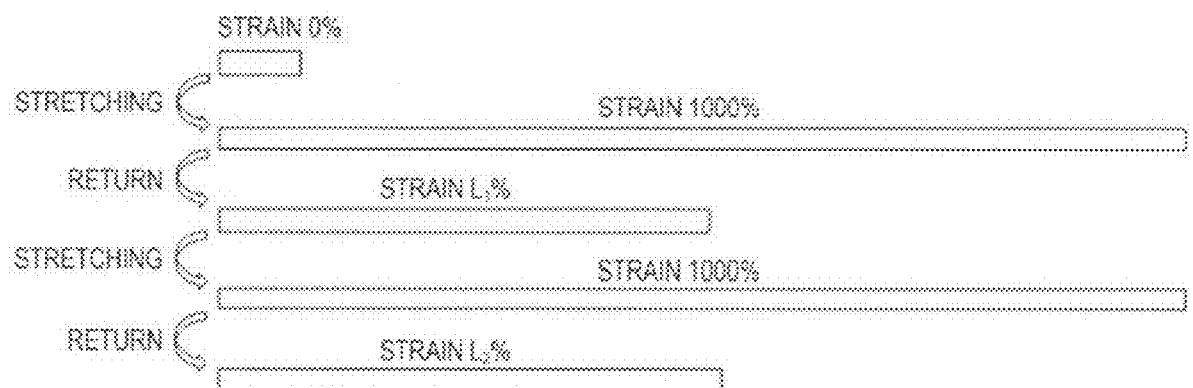
FIG. 4 shows a procedure of evaluation of elasticity of a film.

The elasticity of the films of Examples 2, 4, 5, 6, 8, and 14 were evaluated by the method illustrated in FIG. 4. Taking the distance between chucks (distance between fixing jigs) of 1 cm as 0% strain, strain $L_1$ (%) at the time when the film cut into a strip form having a length of 3 cm and a width of 3 mm was stretched to 11-fold, which was 11 cm (strain: 1000%; displacement length: 10 cm), and strain $L_2$ (%) at the time when the film was stretched again to 11-fold (strain: 1000%) and then returned were shown in Table 3. The strain was determined by displacement length/distance between fixing jigs (1 cm).

TABLE 3

| | 4HB [%] | Mw [×10⁴] | $L_1$ [%] | $L_2$ [%] |
|---|---|---|---|---|
| Example 2 | 18 | 46 | 520 | 560 |
| Example 4 | 16 | 88 | 450 | 500 |
| Example 5 | 17 | 65 | 540 | 580 |
| Example 6 | 11 | 170 | 350 | 400 |
| Example 8 | 21 | 180 | 400 | 450 |
| Example 14 | 30 | 300 | 500 | 520 |

Examples 15 to 18

[Fiber Crystallization]

After the P(3HB-co-4HB) obtained in each of Production Examples 2, 5, and 13 was heated and melted at 170° C. to 180° C. at 5 to 10 minutes, the molten material was extruded from a 2 mm discharge die. Specifically, by using a high-temperature melt-extrusion spinning apparatus (IMC-19F8) available from Imoto Machinery Co., Ltd. (Kyoto), approximately 5 g of a polymer was charged in a cylinder having a diameter of 6 mm and extruded at a piston extrusion speed of 0.5 mm/s. The extrudate was wound by a roller at 23° C., and crystallization was performed by allowing the material wound by the roller to stand still at 23° C. for 30 minutes, and thus a primary PHA fiber was obtained. Although the time of the crystallization also depends on the proportion of 4HB and the crystallization temperature, in a case of P(3HB-co-4HB) having the 4HB proportion of 10 mol % to 30 mol %, the time is from approximately from 1 minute to 120 minutes, and then the next stretching can be performed.

[Stretching after Crystallization]

The primary PHA fiber was pressed toward a metal pin heated to 60° C. (pin formed from stainless steel or chromium-plated, having a cross section of a circle having a diameter of 7 to 8 mm, and having a smooth surface), and a fiber stretched to approximately 5-fold was obtained. The fiber allowed to stand still at 23° C. for 1 month was each used for Examples of 15, 16, and 17. In the same manner as in the case of the film, it is presumed that the degree of orientation determined by X-ray of the α-form is 50% or greater for the fibers in Examples 15 to 17. Note that, although it is a film shape, there is a report of significant reduction of elongation at break due to deterioration over time in an unstretched film of a homopolymer of poly-3-hydroxybutyrate (FIG. 2 of G. J. M. de Koning et al, POLYMER, 1993, Vol. 34, No. 19, 4089 to 4094)

[Evaluation of Long-Term Stability]

A fiber obtained by storing the fiber produced in Example 17 for half a year at 23° C. was used as Example 18.

[Tensile Test: Fiber]

The stretched PHA fiber having a length of 3 cm and a fiber diameter of approximately 0.1 to 0.3 mm (Examples 17 and 18) was subjected to a tensile test until breakage of the fiber by using a tensile tester AGS-X or EZ-Test (available from Shimadzu Corporation) at a temperature of 23° C., a test speed of 20 mm/min, and an initial length of 10 mm. The tensile test results are shown in Table 4. As a result of the tensile test, strain at break (elongation at break) was roughly the same degree, and the deterioration over time was almost suppressed.

TABLE 4

|  | Fiber diameter [mm] | Tensile strength [MPa] | Strain at break [%] | Number of months elapsed |
| --- | --- | --- | --- | --- |
| Example 17 | 0.18 | 337 | 190 | 1 |
| Example 18 | 0.20 | 366 | 186 | 6 |

[Elasticity Evaluation: Fiber]

The PHA fibers prepared in Examples 15 to 17 were evaluated by a cycle test in which each PHA fiber was repeatedly stretched and shrunk. The stretched PHA fiber having a length of 3 cm and a fiber diameter of approximately 0.1 to 0.3 mm was subjected to a cycle test by using a tensile tester AGS-X or EZ-Test (available from Shimadzu Corporation) at a temperature of 23° C., and an initial length of 10 mm. Stretching was performed at a tensile speed of 20 mm/min to a strain of 100% (2-fold length), then the gripper was moved to the original length at the same speed to allow the PHA fiber to shrink. This was repeated five times. The stress-strain curves at the time of the second to fifth shrinkage were shown in FIG. 5 to FIG. 7.

Figure 5:
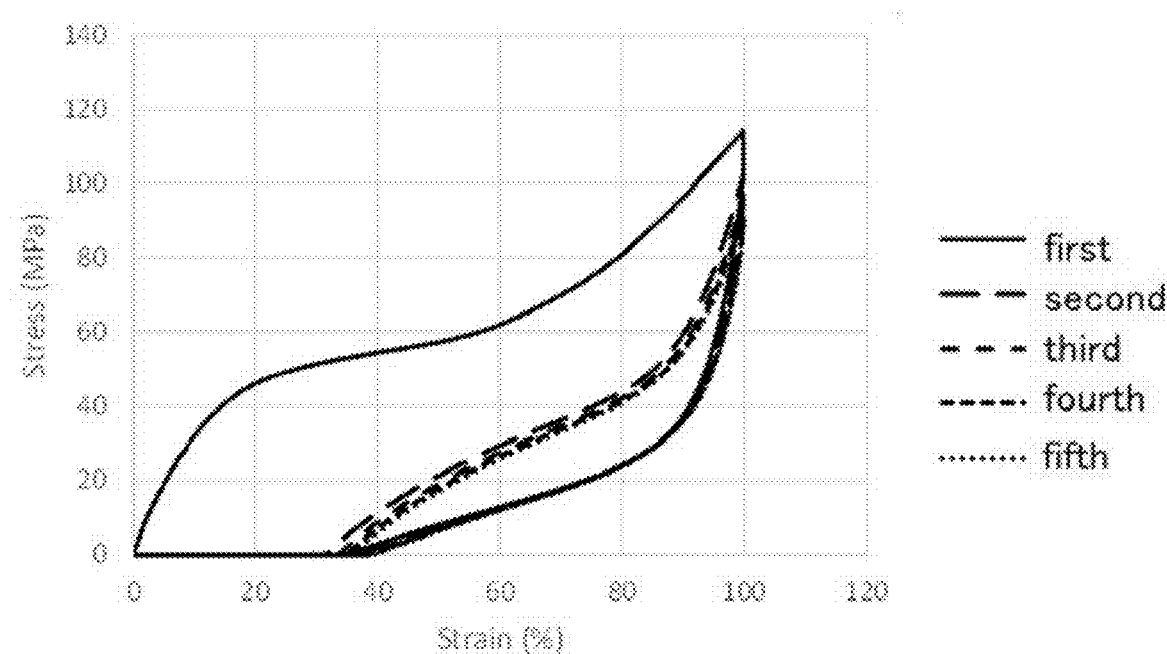
FIG. 5 shows stress-strain curves (0% to 100% strain) of PHA fibers of Example 15 (Production Example 2).

The PHA fiber derived from Production Example 2 produced in Example 15 had the tensile elongation recovery rate (%) of approximately 70% at the time of beginning of the second stretching (i.e., substantially the same at the time of completion of the first shrinkage), and the tensile elongation recovery rate (%) of approximately 70% to approximately 60% at the beginning of the third to fifth stretching (FIG. 5).

Figure 6:
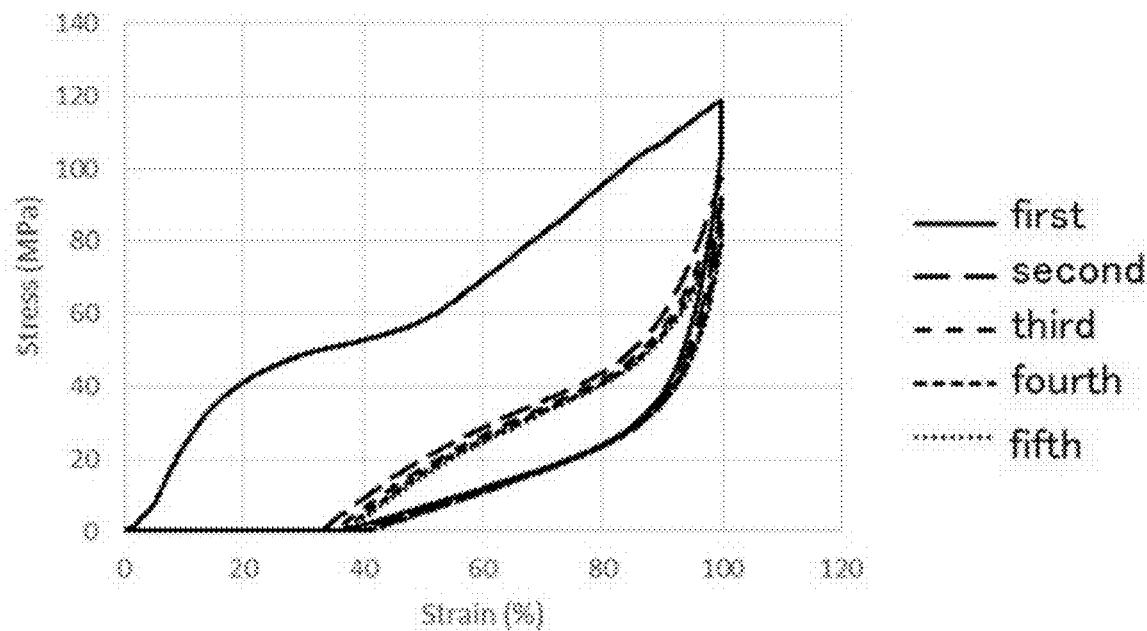
FIG. 6 shows stress-strain curves (0% to 100% strain) of PHA fibers of Example 16 (Production Example 5).

The PHA fiber derived from Production Example 5 produced in Example 16 had the tensile elongation recovery rate (%) of approximately 65% at the time of beginning of the second stretching (i.e., substantially the same at the time of completion of the first shrinkage), and the tensile elongation recovery rate (%) of approximately 65% to approximately 60% at the beginning of the third to fifth stretching (FIG. 6).

Figure 7:
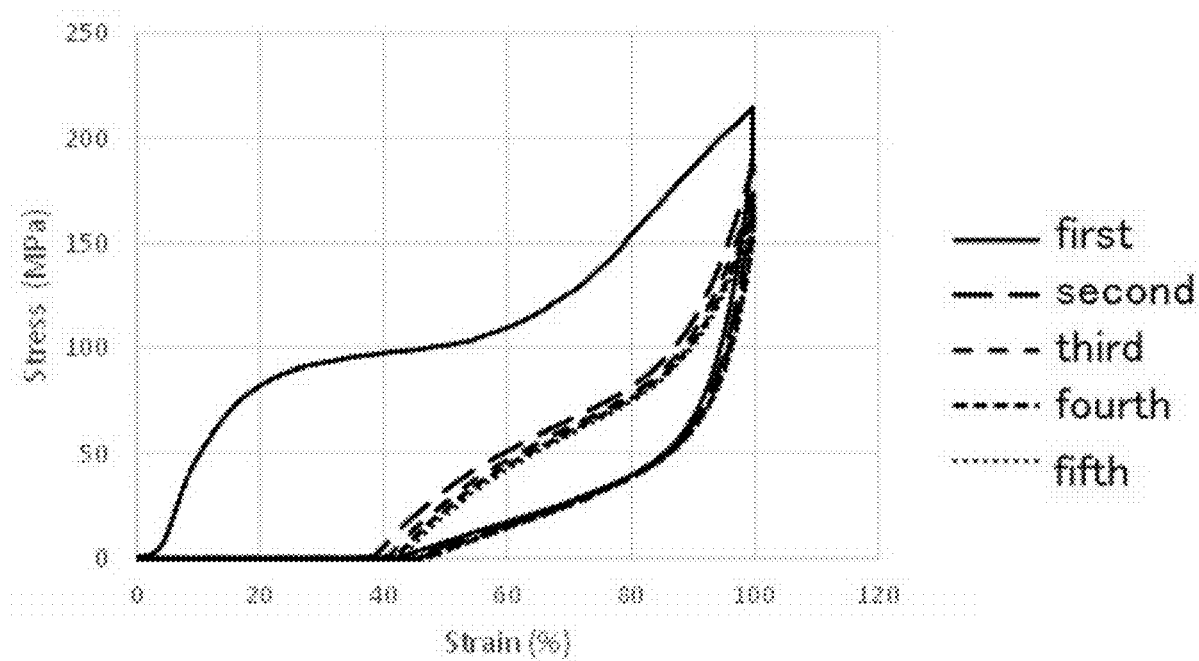
FIG. 7 shows stress-strain curves (0% to 100% strain) of PHA fibers of Example 17 (Production Example 13).

The PHA fiber derived from Production Example 13 produced in Example 17 had the tensile elongation recovery rate (%) of approximately 60% at the time of beginning of the second stretching (i.e., substantially the same at the time of completion of the first shrinkage), and the tensile elongation recovery rate (%) of approximately 60% to approximately 55% at the beginning of the third to fifth stretching (FIG. 7).

Figure 8:
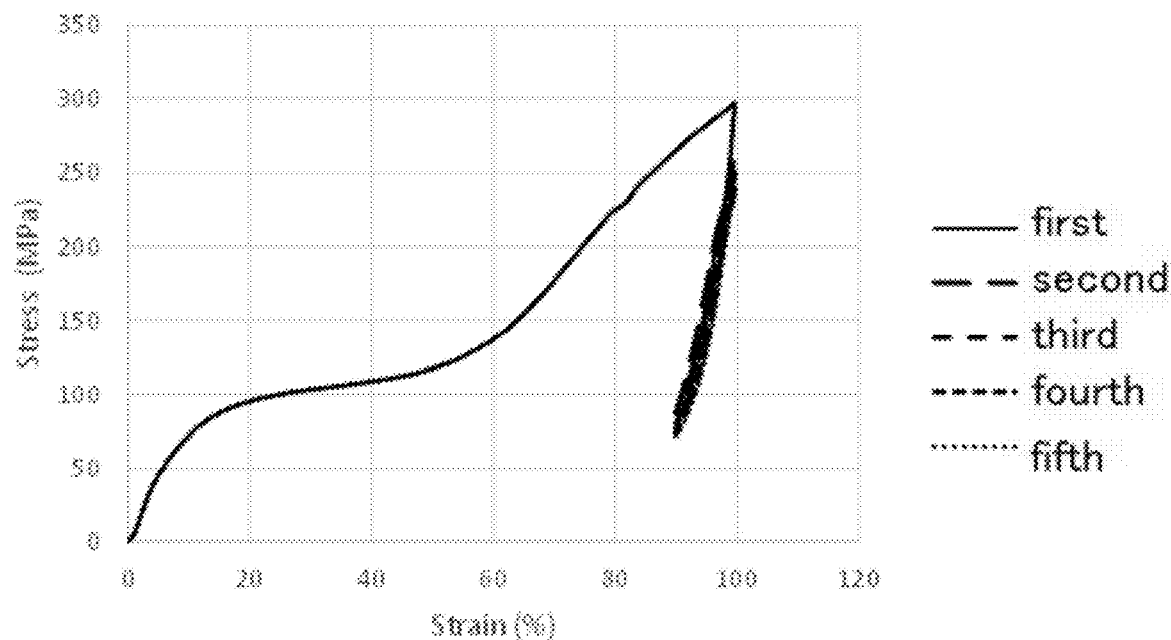
FIG. 8 shows stress-strain curves (0% to 100% strain) of PHA fibers of Example 17 (Production Example 13).

The PHA fiber produced in Example 17 in the same manner as described above was stretched at a tensile speed of 20 mm/min to a strain of 100% (2-fold length), then the gripper was moved at the same speed to a point that stretching was at 90% strain, to allow the PHA fiber to shrink. This was repeated five times. The stress-strain curves at the time of the first to fifth shrinkage were shown in FIG. 8.

The PHA fiber produced in Example 17 was stretched to 100% strain, and repeatedly stretched and shrunk to 90%.

Figure 9:
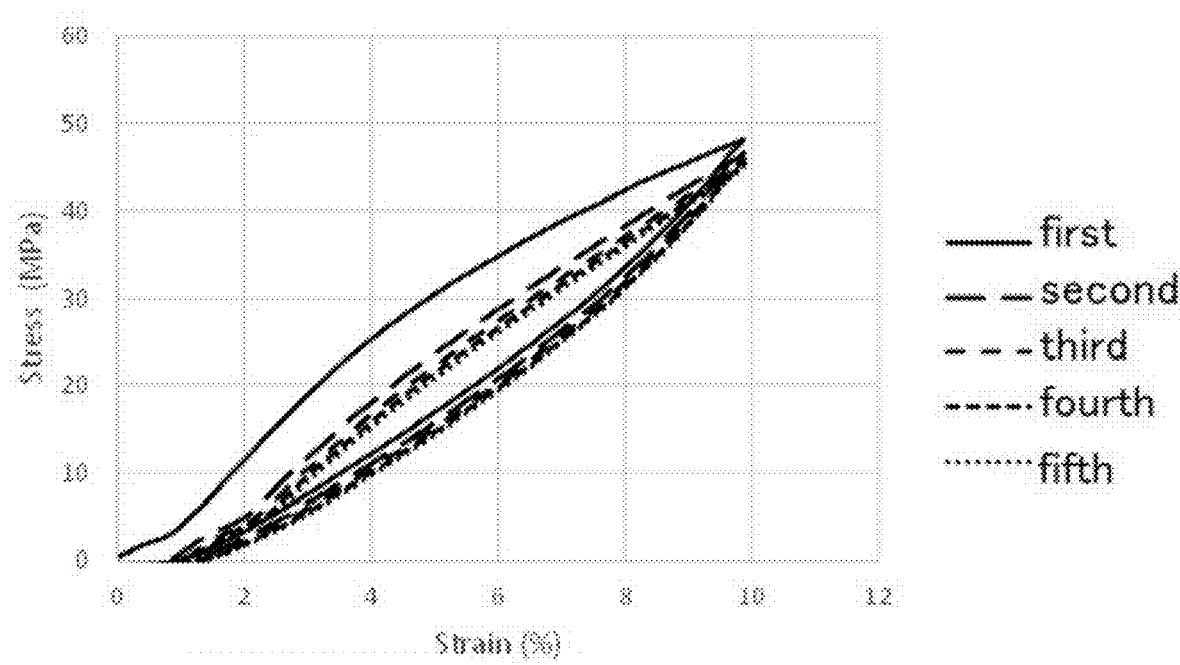
FIG. 9 shows stress-strain curves (0% to 10% strain) of PHA fibers of Example 17 (Production Example 13).

The PHA fiber produced in Example 17 in the same manner as described above was stretched at a tensile speed of 20 mm/min to a strain of 10% (1.1-fold length), then the gripper was moved at the same speed to the original length to allow the PHA fiber to shrink. This was repeated five times. The stress-strain curves at the time of the first to fifth shrinkage were shown in FIG. 9.

The PHA fiber produced in Example 17 was stretched to 10% strain, and repeatedly stretched and shrunk to 1% (1.01-fold).

[Elasticity Evaluation: Film]

The PHA film derived from Production Example 2 was evaluated by a cycle test in which each PHA film was repeatedly stretched and shrunk. The PHA film cut into a length of 3 cm and a width of 3 mm was subjected to a cycle test by using a tensile tester AGS-X or EZ-Test (available from Shimadzu Corporation) at a temperature of 23° C., and an initial length of 10 mm. Stretching was performed at a tensile speed of 20 mm/min to a strain of 1000% (11-fold length), then the gripper was moved to the original length at the same speed to allow the PHA film to shrink. This was repeated five times. The stress-strain curves at the time of the second to fifth stretching/shrinkage were shown in FIG. 10.

Figure 10:
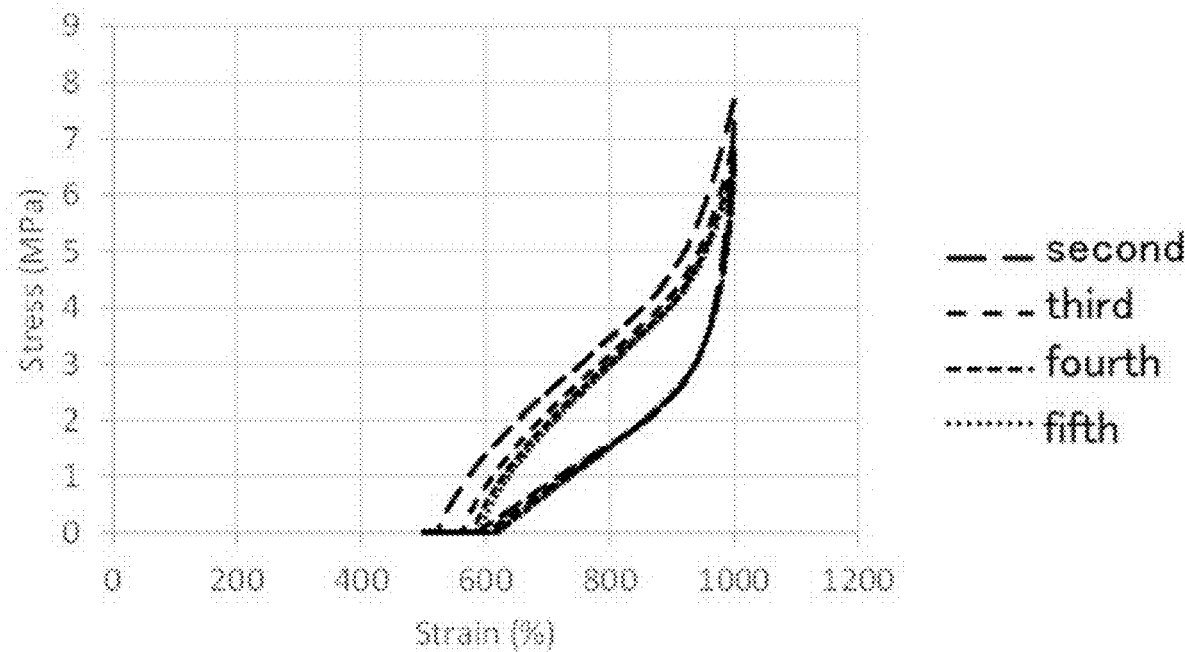
FIG. 10 shows stress-strain curves (0% to 1000% strain) of a PHA film of Example 2 (Production Example 2).

The PHA cast film prepared from Production Example 2 had the deemed tensile elongation recovery rate (%) of approximately 50% at the time of beginning of the second stretching (i.e., substantially the same at the time of completion of the first shrinkage), and the deemed tensile elongation recovery rate (%) of approximately 45% to approximately 40% at the beginning of the third to fifth stretching (FIG. 10). When the tensile elongation recovery rate (%) was calculated based on 0 mm displacement at the initial point of the second stretching, the tensile elongation recovery rate (%) of the third cycle test was 92%, the fourth was 88%, and the fifth was 85%.

Figure 11:
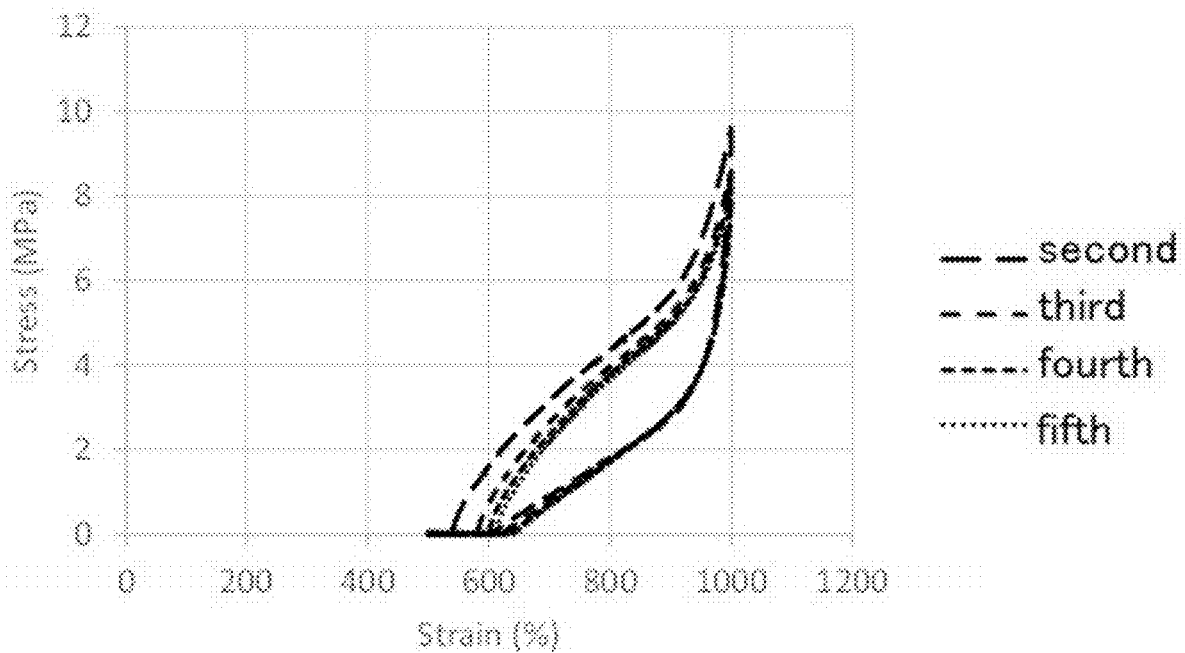
FIG. 11 shows stress-strain curves (0% to 1000% strain) of a PHA film of Example 5 (Production Example 5).

The PHA film derived from Production Example 5 was evaluated by a cycle test in the same manner as described above. The stress-strain curves at the time of the second to fifth shrinkage were shown in FIG. 11.

The PHA film derived from Production Example 5 had the deemed tensile elongation recovery rate (%) of approximately 50% at the time of beginning of the second stretching (i.e., substantially the same at the time of completion of the first shrinkage), and the deemed tensile elongation recovery rate (%) of approximately 45% to approximately 40% at the beginning of the third to fifth stretching. When the tensile elongation recovery rate (%) was calculated based on 0 mm displacement at the initial point of the second stretching, the tensile elongation recovery rate (%) of the third cycle test was 91%, the fourth was 87%, and the fifth was 85%.

Figure 12:
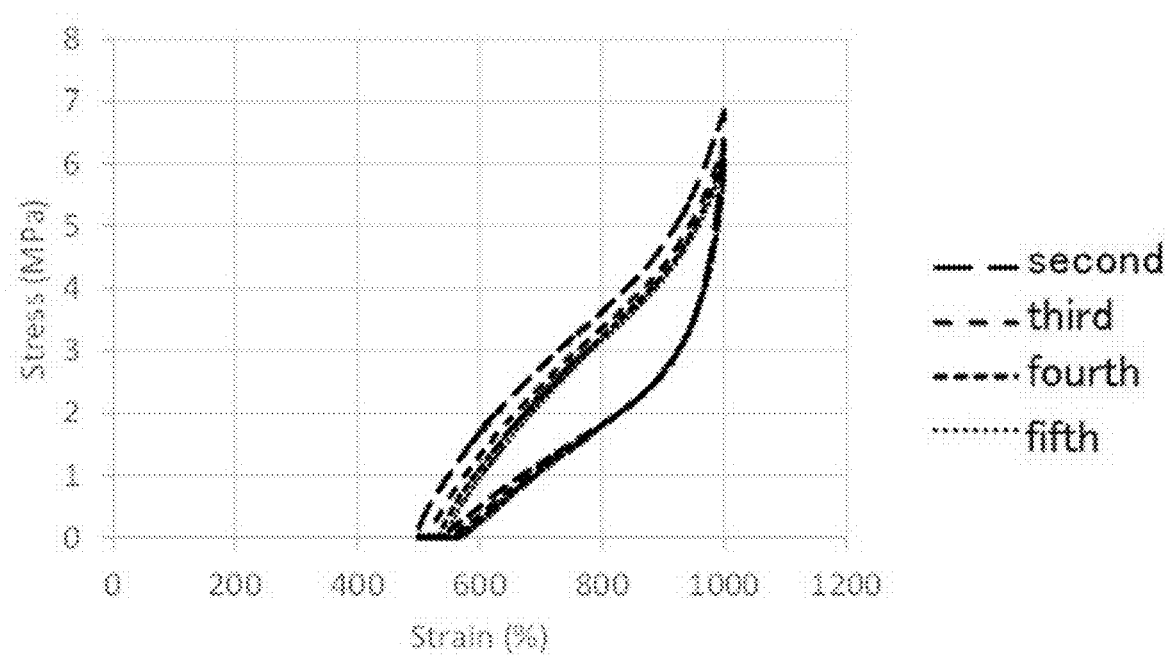
FIG. 12 shows stress-strain curves (0% to 1000% strain) of a PHA film of Example 14 (Production Example 14).
Figure 13:
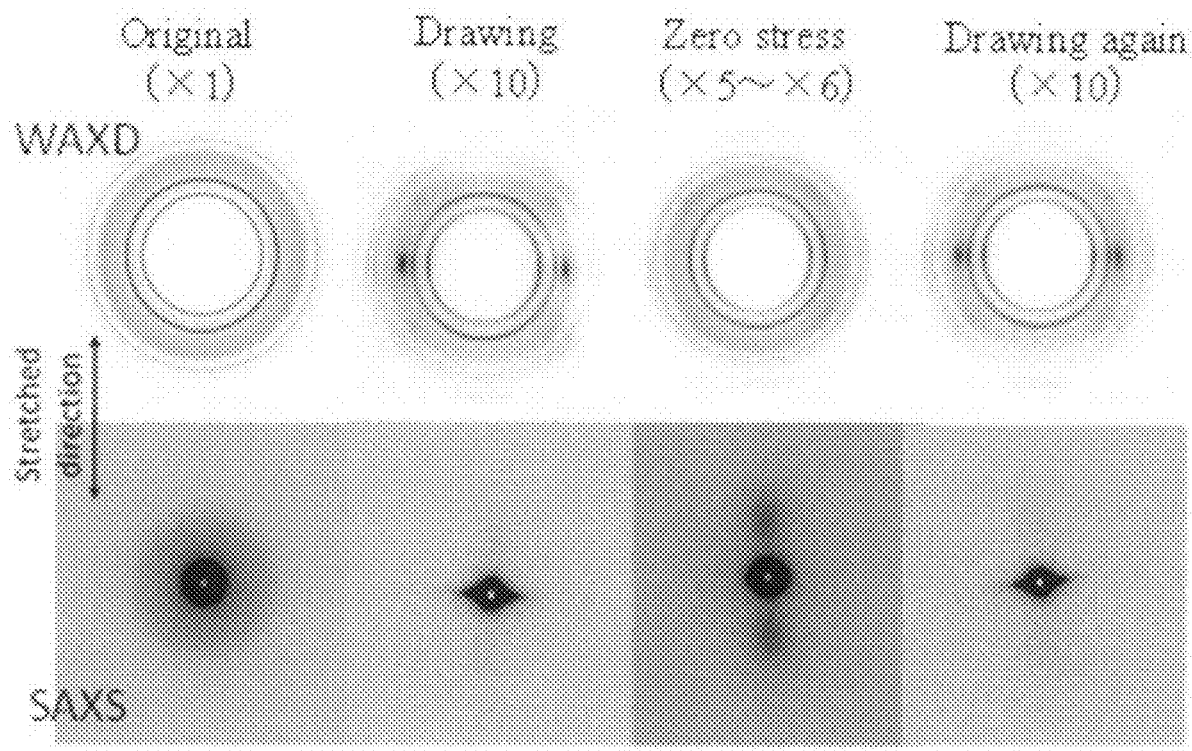
FIG. 13 shows results of WAXD measurement and SAXS measurement of a film molded product of a sample of Production Example 2.
Figure 14:
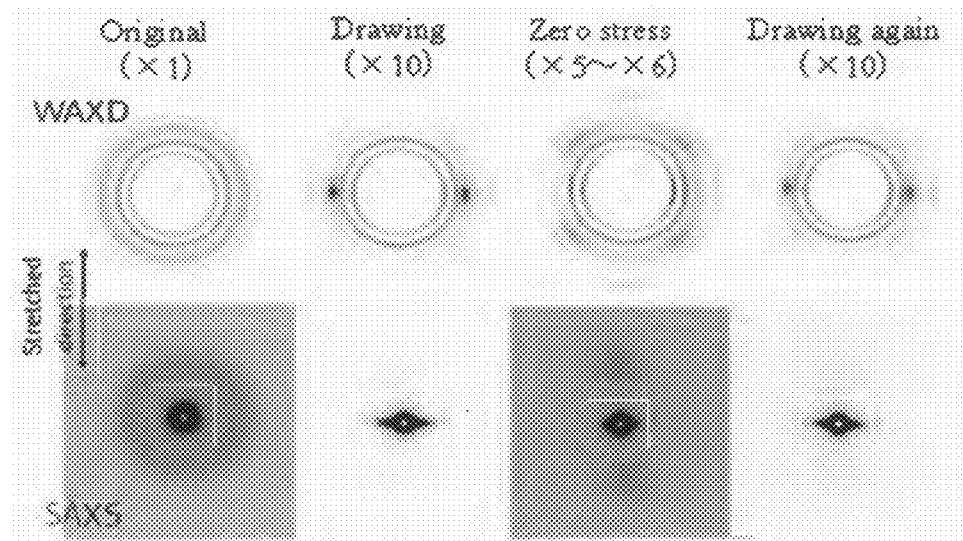
FIG. 14 shows results of WAXD measurement and SAXS measurement of a film molded product of a sample of Production Example 3.
Figure 15:
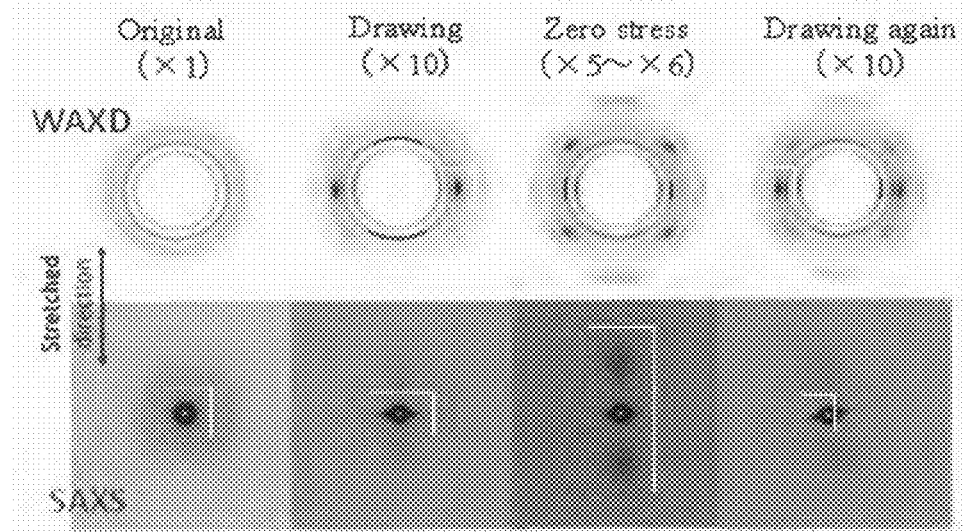
FIG. 15 shows results of WAXD measurement and SAXS measurement of a film molded product of a sample of Production Example 4.
Figure 16:
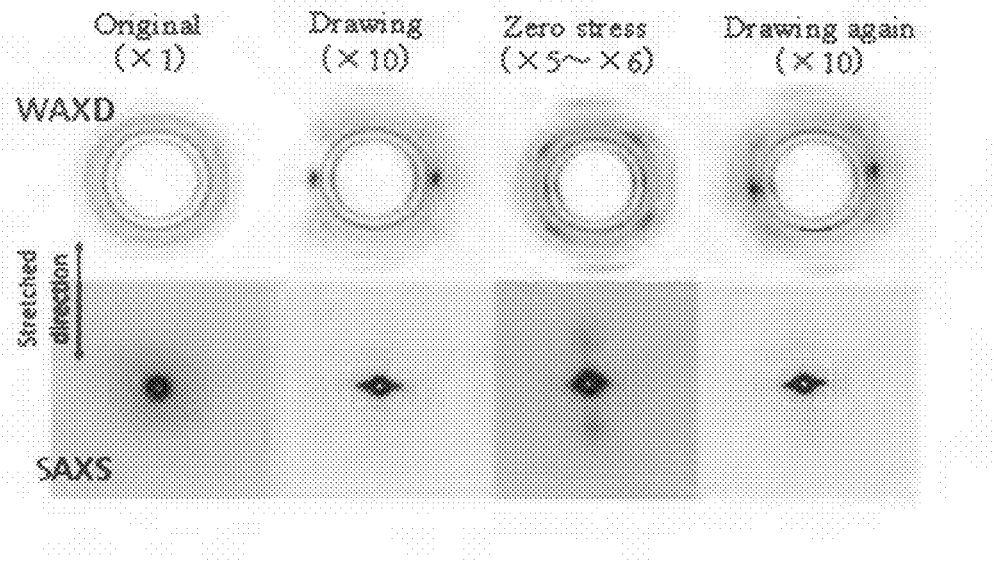
FIG. 16 shows results of WAXD measurement and SAXS measurement of a film molded product of a sample of Production Example 5.
Figure 17:
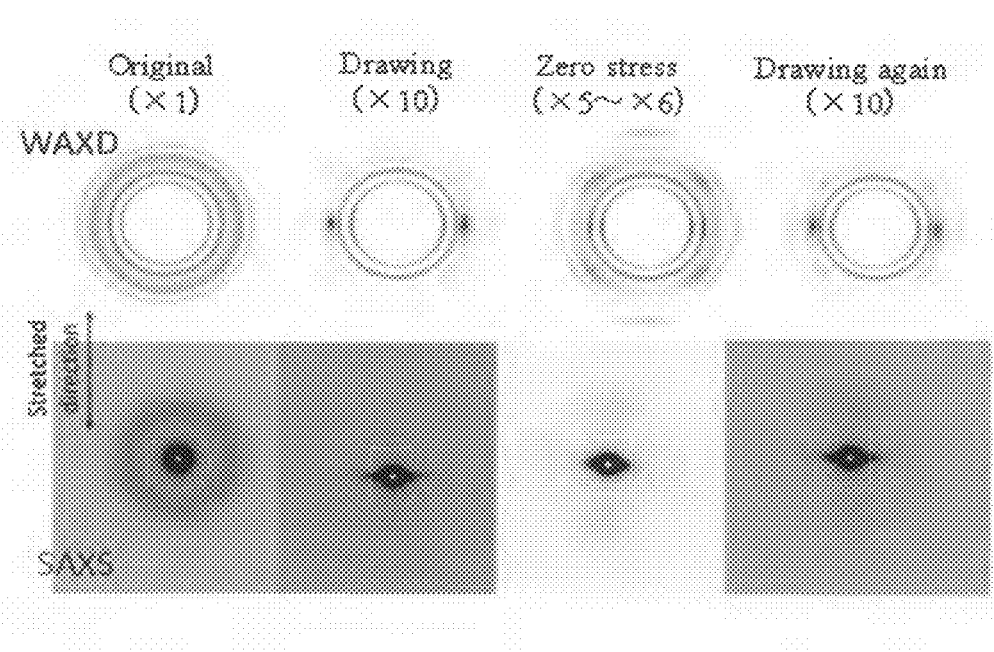
FIG. 17 shows results of WAXD measurement and SAXS measurement of a film molded product of a sample of Production Example 6.
Figure 18:
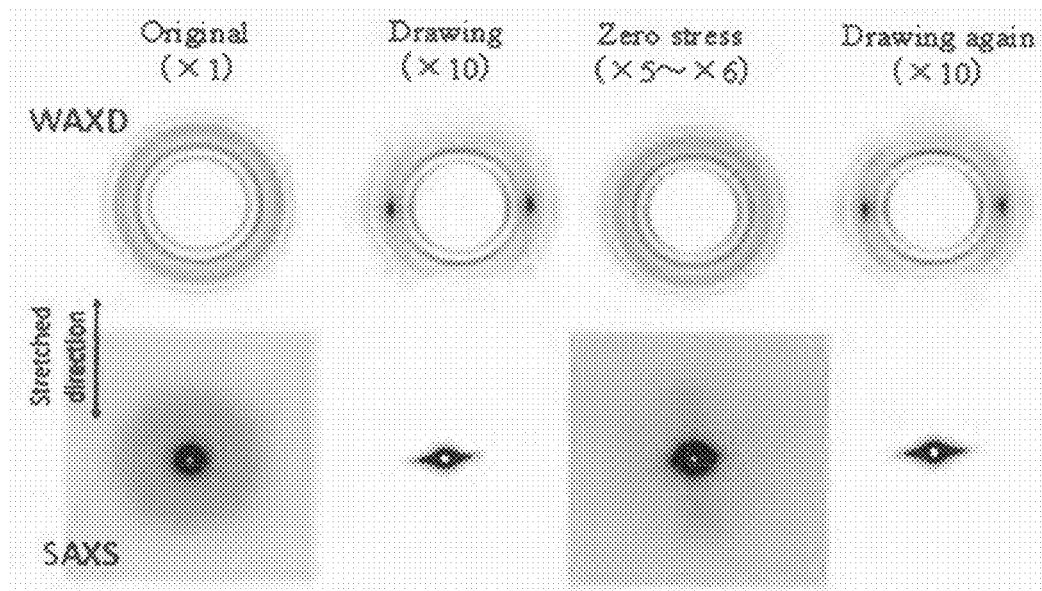
FIG. 18 shows results of WAXD measurement and SAXS measurement of a film molded product of a sample of Production Example 7.
Figure 19:
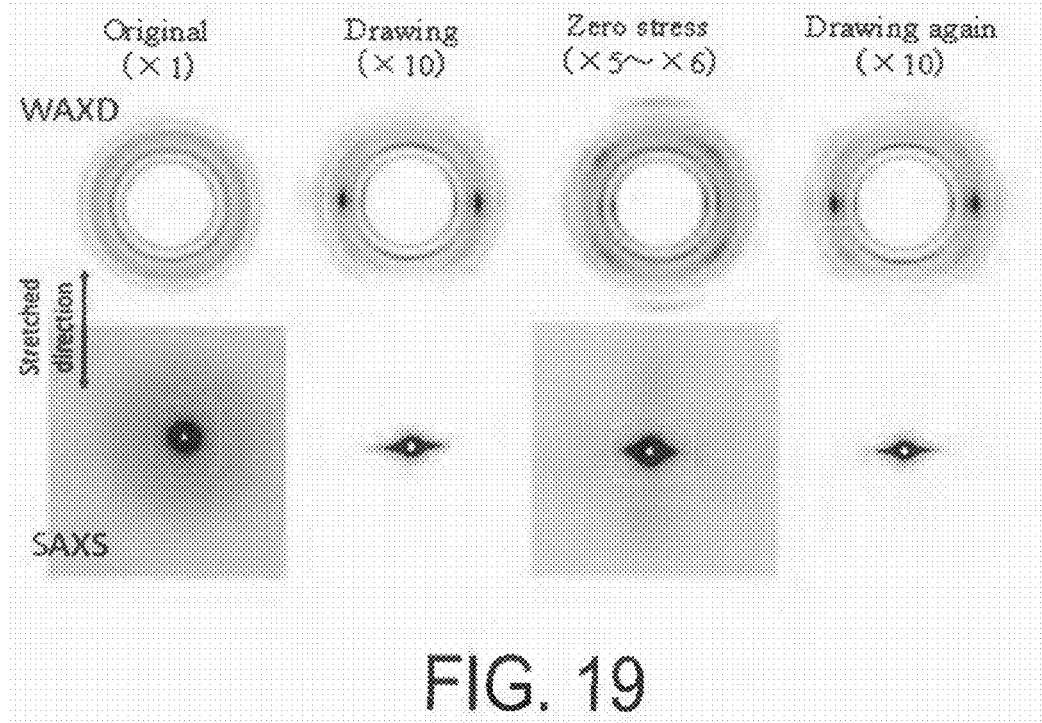
FIG. 19 shows results of WAXD measurement and SAXS measurement of a film molded product of a sample of Production Example 8.
Figure 20:
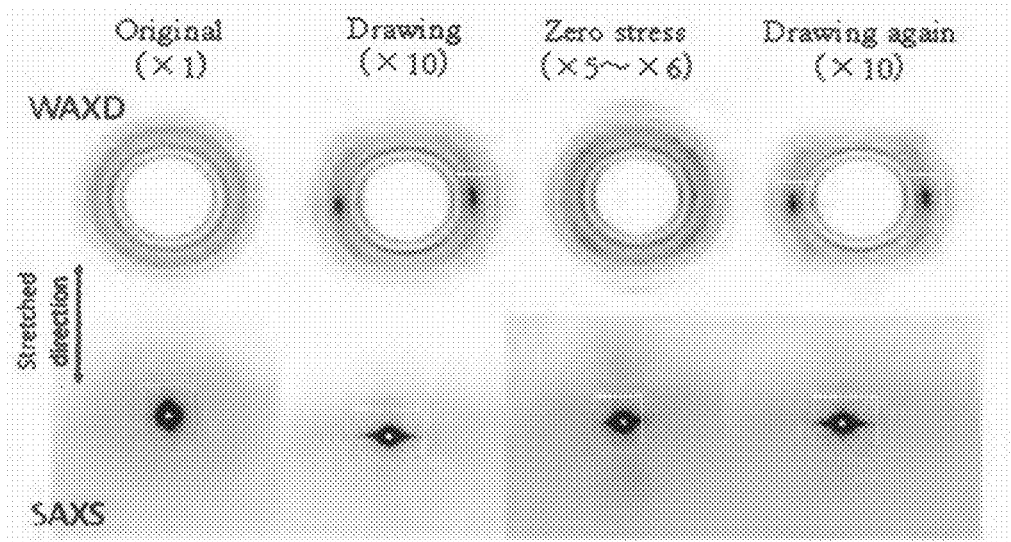
FIG. 20 shows results of WAXD measurement and SAXS measurement of a film molded product of a sample of Production Example 9.
Figure 21:
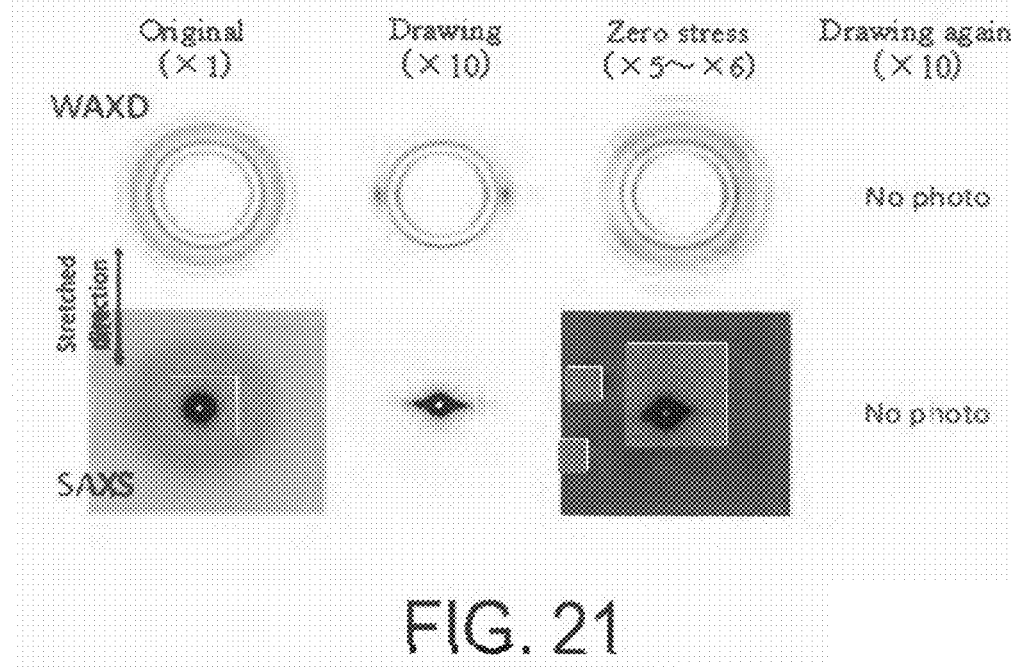
FIG. 21 shows results of WAXD measurement and SAXS measurement of a film molded product of a sample of Production Example 10.
Figure 22:
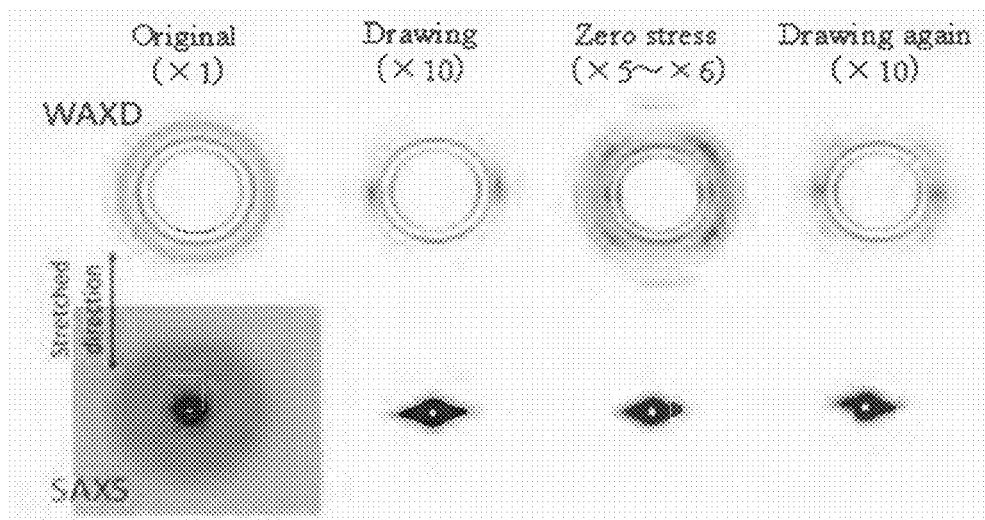
FIG. 22 shows results of WAXD measurement and SAXS measurement of a film molded product of a sample of Production Example 11.
Figure 23:
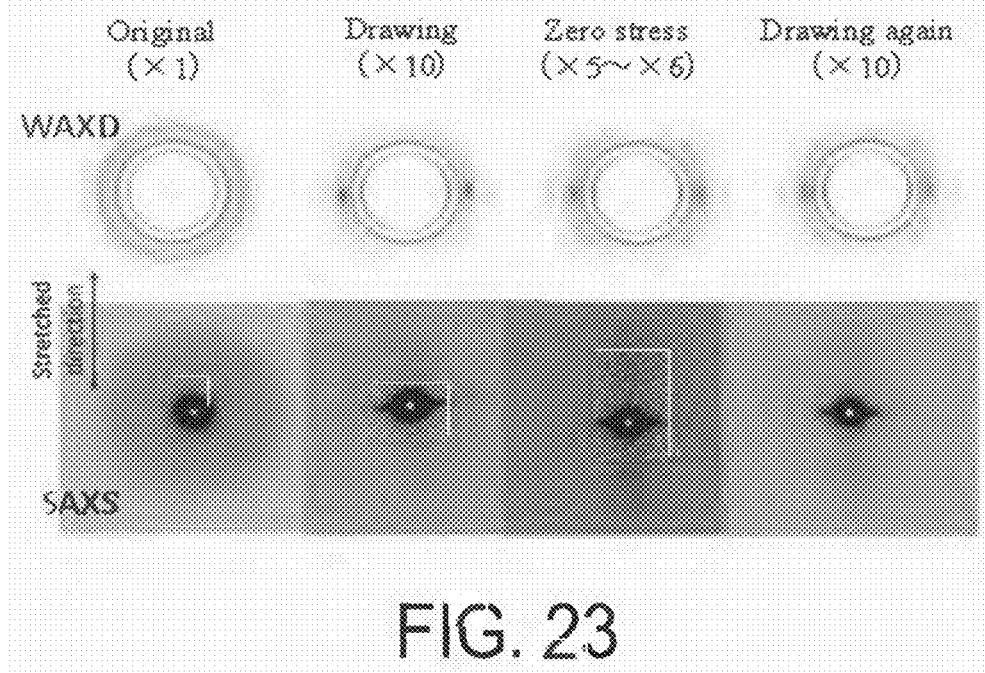
FIG. 23 shows results of WAXD measurement and SAXS measurement of a film molded product of a sample of Production Example 12.

The PHA film derived from Production Example 14 was evaluated by a cycle test in the same manner as described above. The stress-strain curves at the time of the second to fifth shrinkage were shown in FIG. 12.

The PHA film derived from Production Example 14 had the deemed tensile elongation recovery rate (%) of approximately 50% at the time of beginning of the second stretching (i.e., substantially the same at the time of completion of the first shrinkage), and the deemed tensile elongation recovery rate (%) of approximately 50% to approximately 40% at the beginning of the third to fifth stretching. When the tensile elongation recovery rate (%) was calculated based on 0 mm displacement at the initial point of the second stretching, the tensile elongation recovery rate (%) of the third cycle test was 96%, the fourth was 94%, and the fifth was 92%.

Example 19: Production of P(3HB-Co-3HV) Fiber Having Elasticity and Structural Analysis Thereof <Experiment>

P(3HB-co-12%-3HV) (available from Metabolix) was melted at 150° C. for 5 minutes by using a melt spinning apparatus. Then, the extruded resin was necking-stretched to 5-fold by hands, and thus a fiber having an elasticity that can be stretched to 2-fold was produced. By using a synchrotron radiation facility SPring-8 (FSBLO3XU), the obtained elastic fiber was subjected to structural analysis by being irradiated with an X-ray while a cycle test was performed. Specifically, a cycle test was performed in a manner that 0.5 N→2 N→0.5 N→4 N→0.5 N→6 N→0.5 N→10 N→0.5 N, and the relationship between the elasticity and the molecular chain structure was analyzed. Furthermore, the obtained fiber was stretched 1-fold, 1.5-fold, and 2-fold, and then annealed at 100° C. for 24 hours. Stretching and structural analysis were specifically performed in the same manner as in Examples 1 to 14. As described above, 1-fold, 1.5-fold, and 2-fold two-step stretching heat-treated fibers were prepared. The physical property evaluation and structural analysis were performed by a tensile tester and X-ray diffraction.

<Result and Discussion>

[Relationship Between Elasticity and Molecular Chain Structure]

Figure 25:
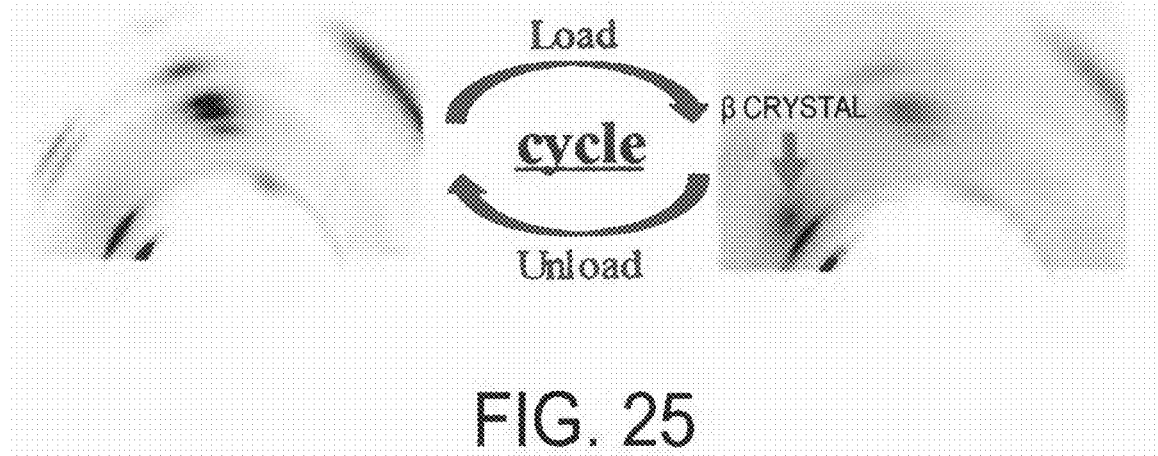
FIG. 25 shows results of WAXD measurement of P(3HB-co-3HV) fibers produced in Example 19.

The elastic fiber was subjected to structural analysis by performing a dynamic test including irradiation with an X-ray while a cycle test was performed. Based on WAXD, an intense peak of β crystal was exhibited when a load was applied, but the peak was reduced when a load was removed (FIG. 25). Furthermore, based on SAXS, a long cycle between α crystals was increased when a load was applied, and the long cycle was reduced when a load was removed. Furthermore, this cyclic change of this long cycle substantially corresponded to the change of distance between the grippers for the fiber. From these, it is conceived that, when a load is applied, the tie molecule in between an α crystal and an α crystal is stretched and exhibits a β crystal; however, when the load is removed, the exhibited crystal returns to the tie molecule. From the results described above, it is conceived that a factor in the elasticity is reversible change between the tie molecule and the β crystal.

[Study for Strengthening Elastic Fiber]

Figure 26:
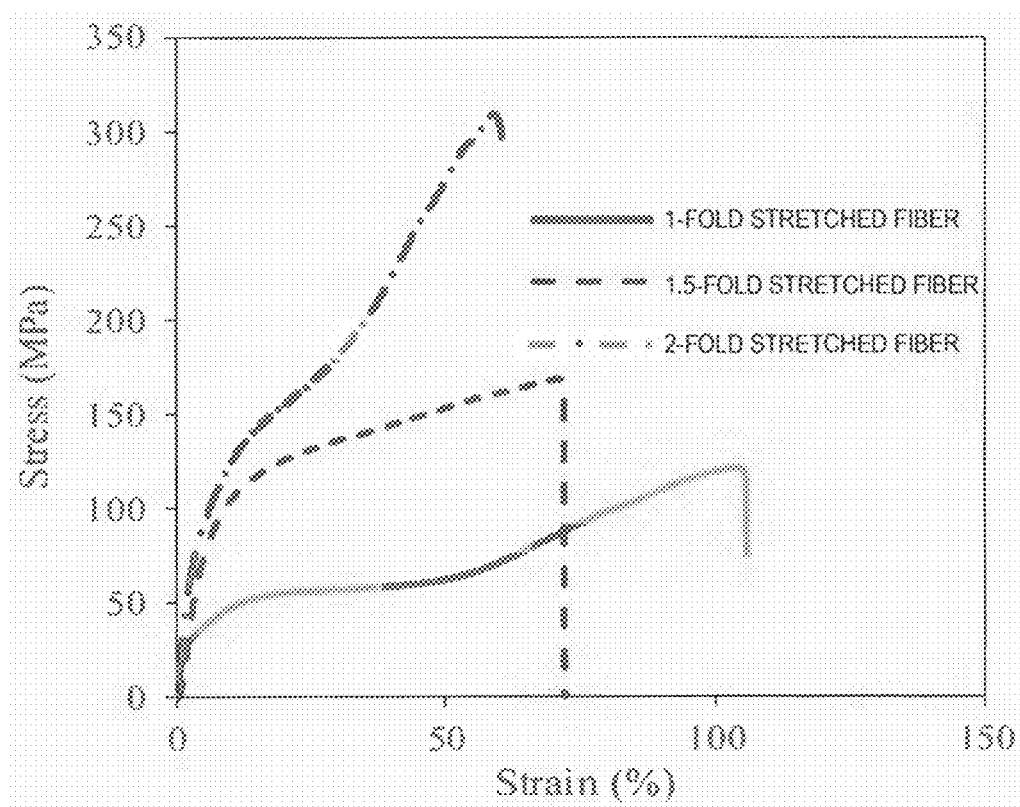
FIG. 26 shows stress-strain curves of P(3HB-co-3HV) fibers produced in Example 19.

As a result of performing a tensile test on 1-fold, 1.5-fold, and 2-fold two-step stretching heat-treated fibers, strength at break was increased as the stretching ratio is increased, and the strength at break of the 2-fold two-step stretching heat-treated fiber was 302 MPa. On the other hand, elongation at break of the fiber was decreased as the stretching ratio was increased (FIG. 26). As a result of the structural analysis, it was found that the shish part of the shish-kebab structure was regularly packed because, from WAXD, for the 1.5-fold and 2-fold two-step stretching heat-treated fibers, the tie molecules in the amorphous region in between an α crystal (lamellar crystal formed from two spiral structure) and an α crystal were stretched and exhibited f3 crystals (plane zigzag structure) derived from the stretched chains of the molecules and, from SAXS, streak scattering was observed for the 1.5-fold and 2-fold two-step stretching heat-treated fibers. From the above, it is conceived that the increase in the strength at break was caused by the molecular chains of the shish part that were regularly packed while being stretched and forming β crystals, and the decrease in elongation at break was caused by the molecular chains fully stretched.

INDUSTRIAL APPLICABILITY

The film, fiber, and other molded product that exhibit biodegradability, biocompatibility, and bioabsorbability and that has elasticity of the present invention are flexible and has followability to external force or to a shape, and are advantageous for industrial use, such as films required to have elasticity, fibers, woven materials using fibers, and composites of films and fibers. The film, fiber, and other molded product of the present invention can be used for applications that utilize biodegradability and bioabsorbability of plastics used in agriculture, fishery, commerce, industry, and medical services.

The invention claimed is:
1. A stretchable polyester, consisting of:
an aliphatic copolymer polyester consisting of, in polymerized form, a 3-hydroxybutyrate unit and a 4-hydroxybutyrate unit,
wherein the stretchable polyester is produced by crystallizing aliphatic copolymer polyester; stretching the crystallized aliphatic copolymer polyester by subjecting the crystallized aliphatic copolymer polyester to an orientation treatment; and removing a tensile load which was added by the orientation and stretching of the crystallized aliphatic copolymer polyester,
wherein the stretchable polyester has an α-form and an amorphous structure,
wherein the α-form has a degree of orientation of 50% or greater as determined by X-ray,
wherein the stretchable polyester, in a stretched state, has a β-form detectable by wide-angle X-ray diffraction and small-angle X-ray scattering,
wherein the stretchable polyester, in an unloaded state, has the β-form reduced compared to the stretched state, or not detectable, by wide-angle X-ray diffraction and small-angle X-ray scattering,
wherein the stretchable polyester has an elasticity with a tensile elongation recovery rate in a range of from 20 to 100%, and wherein the 4-hydroxybutyrate unit is present in the aliphatic copolymer polyester in a range of from 10 to 30 mol %, with respect to all monomer units.

2. The stretchable polyester of claim 1, which exhibits elasticity after performing crystallization, stretching the stretchable polyester, and removing a load.

3. The stretchable polyester of claim 2, wherein the crystal structure is orientation-treated by stretching in a range of from 2 to 20-fold.

4. The stretchable polyester of claim 1, having a crystal structure which is orientation-treated by stretching.

5. The stretchable polyester of claim 1, wherein at least one lamellar crystal structure and at least one amorphous structure are present in the stretchable polyester, and
   wherein the stretchable polyester, in a stretched state, exhibits a stretched chain structure, which is reduced or disappears in the stretchable polyester in an unloaded state.

6. The stretchable polyester of claim 5, wherein at least one folding having a spiral structure is present in the lamellar crystal structure.

7. The stretchable polyester of claim 1, having a plane zigzag structure in stretched state.

8. The stretchable polyester of claim 1, wherein the 4-hydroxybutyrate unit is present in the aliphatic copolymer polyester in a range of from 11 to 29 mol. %, with respect to all monomer units.

9. The stretchable polyester of claim 1, having a weight average molecular weight in a range of from 100,000 to 3,000,000, as determined by gel permeation chromatography, calibrated with polystyrene.

10. The stretchable polyester of claim 1, which is biodegradable.

11. The stretchable polyester of claim 1, which is bioabsorbable.

12. The stretchable polyester of claim 1, which is derived from biosynthesis or derived from chemical synthesis.

13. A film, comprising:
    the stretchable polyester of claim 1.

14. A fiber, comprising:
    the stretchable polyester of claim 1.

15. A molded product, comprising:
    the stretchable polyester of claim 1.

16. The polyester of claim 1, wherein the tensile elongation recovery rate of the stretchable polyester is in a range of from 35 to 95%.

17. A method for producing the stretchable polyester of claim 1, the method comprising:
    orienting the aliphatic copolymer polyester by stretching after crystallization; and
    removing a tensile load of the aliphatic copolymer polyester subjected to the orienting.

18. The method of claim 17, wherein the stretchable polyester is produced in a form of a film, a fiber, or a molded product.

* * * * *